US012421100B2

(12) United States Patent
Ragan et al.

(10) Patent No.: US 12,421,100 B2
(45) **Date of Patent: *Sep. 23, 2025**

(54) ANOMALY DETECTION AND CONTROLLING FUEL DISPENSING OPERATIONS USING FUEL VOLUME DETERMINATIONS

(71) Applicant: 7-Eleven, Inc., Irving, TX (US)

(72) Inventors: Boonchai Matthew Ragan, Lewisville, TX (US); Sravan Kumar Ayyappa Akula, Aubrey, TX (US); Joshua Michael Rothenberg, Dallas, TX (US); Jake Ylli Hoxha, Farmers Branch, TX (US); Srikanth Gandra, Frisco, TX (US); Scott Albert, Dallas, TX (US)

(73) Assignee: 7-ELEVEN, INC., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,780

(22) Filed: Apr. 24, 2024

(65) Prior Publication Data

US 2024/0270563 A1 Aug. 15, 2024

Related U.S. Application Data

(63) Continuation of application No. 18/357,879, filed on Jul. 24, 2023, now Pat. No. 11,993,507, which is a (Continued)

(51) Int. Cl.
*B67D 7/32* (2010.01)
*B67D 7/22* (2010.01)

(52) U.S. Cl.
CPC .......... *B67D 7/3218* (2013.01); *B67D 7/221* (2013.01); *B67D 7/3281* (2013.01)

(58) Field of Classification Search
CPC ........................................................ B67O 7/34
(Continued)

(56) References Cited

U.S. PATENT DOCUMENTS

| | | | |
|---|---|---|---|
| 893,599 | A | 7/1908 | Barker |
| 962,611 | A | 6/1910 | Barker, Jr. |

(Continued)

FOREIGN PATENT DOCUMENTS

| | | | |
|---|---|---|---|
| AU | 2021105207 | A4 | 10/2021 |
| EP | 2 528 043 | A1 | 11/2012 |

OTHER PUBLICATIONS

PCT International Search Report and Written Opinion of the International Searching Authority, or the Declaration for International Application No. PCT/US2024/038943, date of mailing Oct. 11, 2024 (Oct. 11, 2024), 18 pages.

(Continued)

*Primary Examiner* — Md Azad
(74) *Attorney, Agent, or Firm* — Baker Botts L.L.P.

(57) ABSTRACT

A system determines that a fuel dispensing operation may be anomalous. In response, the system accesses fuel inventory data that indicates fuel levels in a fuel tank during a time period. The system determines a measure amount of fuel that left the fuel tank based on the fuel inventory data. The system determines a calculated amount of dispensed fuel associated with one or more fuel dispensing operations during the time period. The system compares the measured amount of fuel that left the fuel tank with the calculated amount of dispensed fuel. The system determines that the measured amount of fuel that left the fuel tank is more than the calculated amount of dispensed fuel. In response, the system concludes that at least one of the fuel dispensing operations is anomalous and causes the fuel dispensing terminal to stop dispensing fuel.

20 Claims, 10 Drawing Sheets

Related U.S. Application Data continuation-in-part of application No. 17/869,656, filed on Jul. 20, 2022, now Pat. No. 12,006,203, which is a continuation of application No. 17/813,546, filed on Jul. 19, 2022.

(58) Field of Classification Search
USPC ........................................................ 700/282
See application file for complete search history.

(56) References Cited

U.S. PATENT DOCUMENTS

| | | | | |
|---|---|---|---|---|
| 977,062 | A | | 11/1910 | Barker |
| 1,930,812 | A | | 10/1933 | Kunitz |
| 1,985,956 | A | | 1/1935 | Spear |
| 2,008,151 | A | | 7/1935 | Nest et al. |
| 2,025,479 | A | | 12/1935 | Spear et al. |
| 2,154,005 | A | | 4/1939 | Logan |
| 2,240,458 | A | | 4/1941 | Grise |
| 2,259,535 | A | | 10/1941 | Tapp et al. |
| 2,262,525 | A | | 11/1941 | De Lancey |
| 2,263,296 | A | | 11/1941 | Grise |
| 2,280,287 | A | | 4/1942 | De Lancey |
| 2,300,145 | A | | 10/1942 | De Lancey |
| 2,322,568 | A | | 6/1943 | De Lancey |
| 2,409,477 | A | | 10/1946 | De Lancey |
| 2,413,035 | A | | 12/1946 | De Lancey |
| 2,445,531 | A | | 7/1948 | Mesh |
| 2,447,744 | A | | 8/1948 | Duemler |
| 2,464,699 | A | | 3/1949 | Logan |
| 2,465,675 | A | | 3/1949 | De Lancey |
| 2,469,272 | A | | 5/1949 | Logan |
| 2,485,207 | A | | 10/1949 | Logan |
| 2,518,021 | A | | 8/1950 | Keay |
| 2,528,696 | A | | 11/1950 | Logan et al. |
| 2,601,041 | A | | 6/1952 | Logan |
| 2,631,657 | A | | 3/1953 | Tapp et al. |
| 2,637,375 | A | | 5/1953 | Tapp et al. |
| 2,649,148 | A | | 8/1953 | Tapp et al. |
| 2,661,795 | A | | 12/1953 | Logan et al. |
| 2,662,477 | A | | 12/1953 | Logan et al. |
| 2,662,542 | A | | 12/1953 | Logan et al. |
| 2,677,417 | A | | 5/1954 | Delmousee et al. |
| 2,682,353 | A | | 6/1954 | Bills et al. |
| 2,742,188 | A | | 4/1956 | Bills et al. |
| 2,996,221 | A | | 8/1961 | Grise |
| 3,084,832 | A | | 4/1963 | Rapisarda |
| 3,220,461 | A | | 11/1965 | Richardson |
| 3,448,843 | A | | 6/1969 | Mesh |
| 3,448,895 | A | | 6/1969 | Mesh |
| 3,814,146 | A | | 6/1974 | Mesh |
| 4,687,033 | A | | 8/1987 | Furrow et al. |
| 4,748,846 | A | | 6/1988 | Haynes |
| 4,799,940 | A | | 1/1989 | Millikan |
| 4,876,653 | A | | 10/1989 | McSpadden et al. |
| 4,930,665 | A | | 6/1990 | Devine |
| 4,934,565 | A | | 6/1990 | Heisey et al. |
| 4,978,029 | A | | 12/1990 | Furrow et al. |
| 4,986,445 | A | | 1/1991 | Young et al. |
| 5,013,434 | A | | 5/1991 | Furrow |
| 5,029,100 | A | | 7/1991 | Young et al. |
| 5,040,577 | A | | 8/1991 | Pope |
| 5,083,846 | A | | 1/1992 | Day, Jr. et al. |
| 5,156,199 | A | | 10/1992 | Hartsell, Jr. et al. |
| 5,269,353 | A | | 12/1993 | Nanaji et al. |
| 5,325,706 | A | | 7/1994 | Grose |
| 5,345,979 | A | | 9/1994 | Tucker et al. |
| 5,355,915 | A | | 10/1994 | Payne |
| 5,363,988 | A | | 11/1994 | Saxton et al. |
| 5,417,256 | A | | 5/1995 | Hartsell, Jr. et al. |
| 5,423,457 | A | | 6/1995 | Nicholas et al. |
| 5,450,883 | A | | 9/1995 | Payne et al. |
| 5,452,750 | A | | 9/1995 | Miller et al. |
| 5,501,246 | A | | 3/1996 | Burns et al. |
| RE35,238 | E | | 5/1996 | Pope |
| 5,542,458 | A | | 8/1996 | Payne et al. |
| 5,554,976 | A | * | 9/1996 | Miyauchi ................ F23N 5/242 137/557 |
| 5,557,084 | A | | 9/1996 | Myers et al. |
| 5,592,979 | A | | 1/1997 | Payne et al. |
| 5,602,745 | A | | 2/1997 | Atchley et al. |
| 5,630,528 | A | | 5/1997 | Nanaji |
| 5,665,895 | A | | 9/1997 | Hart et al. |
| 5,720,325 | A | | 2/1998 | Grantham |
| 5,755,854 | A | | 5/1998 | Nanaji |
| 5,757,664 | A | | 5/1998 | Rogers et al. |
| 5,794,667 | A | | 8/1998 | Payne et al. |
| 5,857,500 | A | | 1/1999 | Payne et al. |
| 5,868,179 | A | | 2/1999 | Hartsell, Jr. |
| 5,871,651 | A | | 2/1999 | McSpadden |
| 5,890,520 | A | | 4/1999 | Johnson, Jr. |
| 5,954,080 | A | | 9/1999 | Leatherman |
| 5,956,259 | A | | 9/1999 | Hartsell, Jr. et al. |
| 5,971,042 | A | | 10/1999 | Hartsell, Jr. |
| 5,996,888 | A | | 12/1999 | Gromatzky |
| 6,026,866 | A | | 2/2000 | Nanaji |
| 6,026,868 | A | | 2/2000 | Johnson, Jr. |
| 6,031,222 | A | | 2/2000 | Carapelli |
| 6,065,638 | A | | 5/2000 | Terranova et al. |
| 6,070,156 | A | | 5/2000 | Hartsell, Jr. |
| 6,073,840 | A | | 6/2000 | Marion |
| 6,082,415 | A | | 7/2000 | Rowland et al. |
| 6,085,775 | A | | 7/2000 | Smith |
| 6,089,284 | A | | 7/2000 | Kaehler et al. |
| 6,092,410 | A | | 7/2000 | Kaehler et al. |
| 6,098,879 | A | | 8/2000 | Terranova |
| 6,102,085 | A | | 8/2000 | Nanaji |
| 6,109,477 | A | | 8/2000 | Myers et al. |
| 6,119,110 | A | | 9/2000 | Carapelli |
| 6,123,118 | A | | 9/2000 | Nanaji |
| 6,149,033 | A | | 11/2000 | Poleshuk |
| 6,157,871 | A | | 12/2000 | Terranova |
| 6,169,938 | B1 | | 1/2001 | Hartsell, Jr. |
| 6,170,539 | B1 | | 1/2001 | Pope et al. |
| 6,196,065 | B1 | | 3/2001 | Henksmeier et al. |
| 6,227,227 | B1 | | 5/2001 | Poleshuk et al. |
| 6,244,310 | B1 | | 6/2001 | Rowland et al. |
| 6,253,779 | B1 | | 7/2001 | Nanaji et al. |
| 6,263,319 | B1 | | 7/2001 | Leatherman |
| 6,296,148 | B1 | | 10/2001 | Myers et al. |
| 6,336,479 | B1 | | 1/2002 | Nanaji |
| 6,338,369 | B1 | | 1/2002 | Shermer et al. |
| 6,347,649 | B1 | | 2/2002 | Pope et al. |
| 6,352,176 | B1 | | 3/2002 | Hartsell, Jr. et al. |
| 6,357,493 | B1 | | 3/2002 | Shermer et al. |
| 6,386,246 | B2 | | 5/2002 | Pope et al. |
| 6,418,983 | B1 | | 7/2002 | Payne et al. |
| 6,422,464 | B1 | | 7/2002 | Terranova |
| 6,431,226 | B1 | | 8/2002 | Koslowsky |
| 6,460,579 | B2 | | 10/2002 | Nanaji |
| 6,470,233 | B1 | | 10/2002 | Johnson, Jr. |
| 6,493,440 | B2 | | 12/2002 | Gromatzky et al. |
| 6,499,516 | B2 | | 12/2002 | Pope et al. |
| 6,505,134 | B2 | | 1/2003 | Poleshuk et al. |
| 6,522,947 | B1 | * | 2/2003 | Hartsell, Jr. ........... G06Q 20/18 700/282 |
| 6,529,800 | B1 | | 3/2003 | Johnson et al. |
| 6,532,999 | B2 | | 3/2003 | Pope et al. |
| 6,546,882 | B1 | | 4/2003 | Gromatzky et al. |
| 6,571,151 | B1 | | 5/2003 | Leatherman |
| 6,574,603 | B1 | | 6/2003 | Dickson et al. |
| 6,644,360 | B1 | | 11/2003 | Sobota et al. |
| 6,697,705 | B2 | | 2/2004 | Johnson et al. |
| 6,763,974 | B1 | | 7/2004 | Shermer et al. |
| 6,810,304 | B1 | | 10/2004 | Dickson |
| 6,813,609 | B2 | | 11/2004 | Wilson |
| 6,827,236 | B2 | | 12/2004 | Shermer et al. |
| 6,830,080 | B2 | | 12/2004 | Nanaji |
| 6,854,342 | B2 | | 2/2005 | Payne et al. |
| 6,882,941 | B2 | | 4/2005 | Nanaji et al. |
| 6,899,149 | B1 | | 5/2005 | Hartsell, Jr. et al. |
| 6,923,221 | B2 | | 8/2005 | Riffle |
| 6,935,161 | B2 | | 8/2005 | Hutchinson |
| 6,935,191 | B2 | | 8/2005 | Olivier et al. |
| 6,941,978 | B2 | | 9/2005 | Riffle |

(56) References Cited

U.S. PATENT DOCUMENTS 6,962,269 B2 11/2005 Hutchinson
6,969,837 B2 11/2005 Ye et al.
6,974,054 B2 12/2005 Hutchinson
6,978,660 B2 12/2005 Hutchinson et al.
6,996,485 B2 2/2006 Payne
7,010,961 B2 3/2006 Hutchinson et al.
7,020,541 B2 3/2006 Wilson
7,027,890 B2 4/2006 Wilson
7,028,561 B2 4/2006 Robertson et al.
7,076,330 B1 * 7/2006 Dickson ................. B67D 7/085 700/244
7,076,994 B2 7/2006 Hutchinson et al.
7,111,520 B2 9/2006 Payne et al.
7,260,499 B2 * 8/2007 Watzke, Jr. .............. B67D 7/32 700/282
7,289,877 B2 10/2007 Wilson
7,455,194 B2 11/2008 Hutchinson
7,575,015 B2 8/2009 Reid et al.
7,681,460 B2 3/2010 Nanaji et al.
7,721,720 B2 5/2010 Payne et al.
7,725,271 B2 5/2010 Yang et al.
7,841,317 B2 11/2010 Williams et al.
7,913,664 B2 3/2011 Williams et al.
7,953,968 B2 5/2011 Robertson et al.
7,954,386 B2 6/2011 Nanaji et al.
7,987,878 B1 8/2011 Imler
8,006,677 B2 8/2011 Williams et al.
8,042,376 B2 10/2011 Yang et al.
8,096,446 B2 1/2012 Carapelli
8,240,515 B2 8/2012 Kinzie et al.
8,285,506 B2 10/2012 Oldham et al.
8,342,199 B2 1/2013 Deline et al.
8,376,185 B2 2/2013 Liebal et al.
8,381,597 B2 2/2013 Carapelli
8,444,014 B2 5/2013 McSpadden et al.
8,485,165 B2 7/2013 Payne et al.
8,539,991 B1 9/2013 Carmack et al.
8,726,893 B2 5/2014 Williams et al.
8,733,590 B2 5/2014 Bartlett et al.
8,757,009 B2 6/2014 Jennings et al.
8,757,010 B2 6/2014 Williams et al.
8,893,691 B2 11/2014 Payne et al.
8,960,019 B1 2/2015 Oldham et al.
9,082,248 B2 7/2015 Payne et al.
9,302,899 B2 4/2016 Williams et al.
9,377,332 B2 6/2016 Carapelli
9,422,147 B2 8/2016 Bartlett et al.
9,458,772 B2 10/2016 Williams et al.
9,475,687 B2 10/2016 Deline
9,523,597 B2 12/2016 Williams et al.
9,804,016 B2 10/2017 Liebal et al.
9,878,896 B2 1/2018 Liebal et al.
9,897,509 B2 2/2018 Garrett
9,964,054 B2 5/2018 Payne et al.
10,019,953 B2 7/2018 Payne et al.
10,077,872 B2 9/2018 Grimmer et al.
10,088,109 B2 10/2018 Grimmer et al.
10,109,142 B2 10/2018 Robertson et al.
10,173,885 B2 1/2019 Carapelli
10,266,387 B2 4/2019 Carapelli et al.
10,316,769 B2 6/2019 Payne et al.
10,332,083 B2 6/2019 Williams et al.
10,679,456 B2 6/2020 Payne et al.
10,703,622 B2 7/2020 Carapelli et al.
10,778,009 B2 9/2020 Carapelli et al.
11,008,210 B2 5/2021 Carapelli et al.
11,078,068 B2 8/2021 Lucas et al.
11,242,239 B2 2/2022 Long
11,393,051 B2 7/2022 Williams et al.
11,462,070 B2 10/2022 Robertson et al.
11,481,745 B2 10/2022 Slabbekoorn et al.
11,482,863 B2 10/2022 Carapelli et al.
11,673,792 B2 6/2023 Lucas et al.
11,695,448 B2 7/2023 Myers et al.
2001/0000282 A1 4/2001 Poleshuk et al.
2001/0004909 A1 6/2001 Pope et al.
2001/0020198 A1 9/2001 Wilson
2001/0020493 A1 9/2001 Nanaji
2002/0005785 A1 * 1/2002 Ohmi ................... G05D 7/0635 137/557
2002/0014952 A1 2/2002 Terranova
2002/0043292 A1 4/2002 Pope et al.
2002/0046117 A1 4/2002 Marion
2002/0056487 A1 5/2002 Pope et al.
2002/0062174 A1 5/2002 Wilson
2002/0107608 A1 8/2002 Wilson
2002/0154255 A1 10/2002 Gromatzky et al.
2003/0065422 A1 4/2003 Johnson et al.
2003/0200008 A1 10/2003 Wilson
2003/0205287 A1 11/2003 Sobota et al.
2003/0230592 A1 12/2003 Hutchinson
2003/0230593 A1 12/2003 Hutchinson
2004/0035220 A1 2/2004 Payne et al.
2004/0088122 A1 5/2004 Nanaji et al.
2004/0177894 A1 9/2004 Nanaji
2004/0187953 A1 9/2004 Shermer et al.
2004/0187954 A1 9/2004 Shermer et al.
2004/0261503 A1 12/2004 Hutchinson et al.
2005/0028610 A1 2/2005 Olivier et al.
2005/0034508 A1 2/2005 Hutchinson
2005/0039546 A1 2/2005 Payne et al.
2005/0121100 A1 6/2005 Riffle
2005/0121101 A1 6/2005 Riffle
2005/0126307 A1 6/2005 Robertson et al.
2005/0205157 A1 9/2005 Hutchinson
2005/0247112 A1 11/2005 Hutchinson et al.
2005/0262027 A1 11/2005 Hutchinson et al.
2005/0283329 A1 12/2005 Payne
2006/0090547 A1 5/2006 Hutchinson et al.
2006/0190129 A1 8/2006 DeLine et al.
2006/0260681 A1 11/2006 Reid et al.
2007/0033398 A1 2/2007 Robertson et al.
2007/0175459 A1 8/2007 Williams et al.
2007/0240687 A1 10/2007 Payne et al.
2008/0257429 A1 10/2008 Nanaji et al.
2008/0262701 A1 10/2008 Williams et al.
2008/0295568 A1 12/2008 Nanaji et al.
2009/0048711 A1 2/2009 DeLine
2009/0114676 A1 5/2009 Showers et al.
2009/0125153 A1 5/2009 Yang et al.
2009/0293989 A1 12/2009 Yang et al.
2009/0314804 A1 12/2009 Kinzie et al.
2010/0122990 A1 5/2010 Carapelli
2010/0139782 A1 6/2010 Deline et al.
2010/0161200 A1 6/2010 Payne et al.
2010/0172767 A1 7/2010 Nanaji et al.
2010/0230437 A1 9/2010 Carapelli
2011/0029219 A1 2/2011 Williams et al.
2011/0031267 A1 2/2011 Liebal et al.
2011/0093118 A1 * 4/2011 McSpadden .......... G01F 15/063 702/45
2011/0094287 A1 4/2011 Nanaji et al.
2011/0191037 A1 8/2011 Oldham et al.
2011/0224884 A1 9/2011 Williams et al.
2011/0231648 A1 9/2011 Robertson et al.
2011/0273371 A1 11/2011 Payne et al.
2012/0024892 A1 2/2012 Bartlett et al.
2012/0150344 A1 6/2012 Jennings
2013/0110286 A1 5/2013 Williams et al.
2013/0126553 A1 5/2013 Williams
2013/0246171 A1 9/2013 Carapelli
2013/0304360 A1 11/2013 Payne et al.
2014/0071073 A1 3/2014 Williams et al.
2014/0238534 A1 8/2014 Bartlett et al.
2014/0251292 A1 9/2014 Williams et al.
2014/0260514 A1 9/2014 Williams et al.
2014/0260674 A1 9/2014 Carapelli
2014/0299222 A1 10/2014 Williams et al.
2015/0106196 A1 4/2015 Williams et al.
2015/0153210 A1 6/2015 Bartlett et al.
2015/0317933 A1 11/2015 Payne et al.
2015/0346163 A1 12/2015 Garrett
2016/0016783 A1 1/2016 Rubin-Ayma et al.
2016/0034899 A1 2/2016 Myers et al.

(56) References Cited

U.S. PATENT DOCUMENTS

| | | | |
|---|---|---|---|
| 2016/0102618 A1 | 4/2016 | Payne et al. | |
| 2016/0122174 A1 | 5/2016 | Liebal et al. | |
| 2016/0122175 A1 | 5/2016 | Liebal et al. | |
| 2016/0123536 A1 | 5/2016 | Grimmer et al. | |
| 2016/0160767 A9 | 6/2016 | Williams et al. | |
| 2016/0214851 A1 | 7/2016 | Bonelli et al. | |
| 2016/0245459 A1 | 8/2016 | Grimmer et al. | |
| 2017/0253474 A1 | 9/2017 | Carapelli | |
| 2017/0275148 A1 | 9/2017 | Williams et al. | |
| 2017/0278338 A1 | 9/2017 | Payne et al. | |
| 2017/0283239 A1 | 10/2017 | Carapelli et al. | |
| 2017/0358040 A1 | 12/2017 | Williams et al. | |
| 2018/0009651 A1* | 1/2018 | Payne | H04W 4/023 |
| 2018/0014342 A1 | 1/2018 | Hinz et al. | |
| 2018/0102648 A1 | 4/2018 | Carapelli et al. | |
| 2018/0209940 A1 | 7/2018 | Carapelli et al. | |
| 2018/0229997 A1 | 8/2018 | Long | |
| 2018/0252173 A1 | 9/2018 | Payne et al. | |
| 2018/0275688 A1 | 9/2018 | Oldham | |
| 2018/0352265 A1* | 12/2018 | Carapelli | G06Q 30/02 |
| 2019/0043299 A1 | 2/2019 | Robertson et al. | |
| 2019/0135608 A1 | 5/2019 | Carapelli et al. | |
| 2020/0112343 A1 | 4/2020 | Myers et al. | |
| 2020/0369509 A1 | 11/2020 | Lucas et al. | |
| 2020/0412127 A1 | 12/2020 | Carapelli et al. | |
| 2021/0174323 A1 | 6/2021 | Slabbekoorn et al. | |
| 2021/0362997 A1 | 11/2021 | Lucas et al. | |
| 2021/0374413 A1 | 12/2021 | Fieglein et al. | |
| 2022/0153569 A1 | 5/2022 | Long | |
| 2022/0194776 A1* | 6/2022 | Swaroop | G01F 1/007 |
| 2022/0351308 A1 | 11/2022 | Williams et al. | |
| 2023/0103400 A1* | 4/2023 | Hairston | G07F 13/025 700/283 |
| 2023/0278855 A1 | 9/2023 | Lucas et al. | |

OTHER PUBLICATIONS

International PCT Search Report and Written Opinion of the International Searching Authority, or the Declaration for Application Serial No. PCT/US2023/027494 dated Oct. 25, 2023; 13 pages.

International PCT Search Report and Written Opinion of the International Searching Authority, or the Declaration for Application Serial No. PCT/US2023/027503 dated Oct. 25, 2023; 15 pages.

* cited by examiner

ANOMALY DETECTION AND CONTROLLING FUEL DISPENSING OPERATIONS USING FUEL VOLUME DETERMINATIONS

CROSS-REFERENCE TO RELATED APPLICATIONS

This application is a continuation of U.S. patent application Ser. No. 18/357,879 filed Jul. 24, 2023 by Boonchai Matthew Ragan et al., and entitled "ANOMALY DETECTION DURING FUEL DISPENSING OPERATIONS FUEL VOLUME DETERMINATIONS"; which is a continuation-in-part of U.S. patent application Ser. No. 17/869,656 filed Jul. 20, 2022, by Boonchai Matthew Ragan et al., and entitled "ANOMALY DETECTION AND CONTROLLING OPERATIONS OF FUEL DISPENSING TERMINAL DURING OPERATIONS"; which is a continuation of U.S. patent application Ser. No. 17/813,546 filed Jul. 19, 2022, by Boonchai Matthew Ragan et al., and entitled "ANOMALY DETECTION DURING FUEL DISPENSING OPERATIONS"; all of which are incorporated herein by reference in their entirety.

TECHNICAL FIELD

The present disclosure relates generally to signal processing and control processing, and more specifically to anomaly detection during fuel dispensing operations using fuel volume determinations.

BACKGROUND

Conventional fuel dispensing terminals are typically configured to facilitate dispensing fuel to a user. A user can operate a fuel dispensing terminal to dispense fuel into a vehicle. It is challenging to determine how much fuel is actually dispensed from a fuel dispensing terminal.

SUMMARY

The system described in the present disclosure provides several practical applications and technical advantages that overcome the current technical problems as described herein. The following disclosure is particularly integrated into a practical application of anomaly detection at fuel dispensing terminals. This, in turn, provides an additional practical application of improving the underlying operations of the fuel dispensing terminals. The disclosed system is further integrated into an additional practical application of stopping a fuel dispensing operation if it is determined that a fuel dispensing operation is anomalous or malicious. These practical applications and technical advantages derived from them are described below.

Anomaly Detection During Fuel Dispensing Operations

The disclosed system contemplates a system and a method for anomaly detection during fuel dispensing operations. An anomaly may indicate that there is a discrepancy between the actual fuel dispensed from a fuel dispensing terminal and a measured fuel volume dispensed. In some cases, a bad actor may manipulate a fuel dispensing terminal to falsify a fuel flow reading or measurement of a fuel dispensing terminal. An example way of manipulating a fuel dispensing terminal is described below.

Current fuel dispensing terminals have a pulser rod component that is configured to rotate when fuel is dispensed from the fuel dispensing terminal. As the pulser rod rotates, it turns mechanical gears of a meter component that is configured to determine or measure how much fuel is being dispensed at a given timestamp. When a user starts pumping fuel from a fuel dispensing terminal into a vehicle, the pulser rod located within the fuel dispensing terminal starts to rotate, which in turn, rotates the gears of the meter component. This fuel amount is shown on a user interface on the fuel dispensing terminal and transmitted to a computing device in a gas station to display how much fuel a user is dispensing from the fuel dispensing terminal. The fuel dispensing system within the fuel dispensing terminal is pressurized at a constant pressure. This causes the fuel flow rate from a nozzle of the fuel dispensing terminal to be constant regardless of how fast or slow the pulser rod is rotating. A bad actor may manipulate the pulser rod to turn slower than a predetermined and known speed. For example, a malicious device may be installed or put in place adjacent to the pulser rod inside the housing of the fuel dispensing terminal that causes the pulser rod to rotate slower than the known speed. The malicious device may be a mechanical device, for example. In the same or another example, the malicious device may be an electronic device that includes microchips, processors, and/or circuit boards that can be controlled remotely via wireless communication, e.g., Bluetooth and the like. For example, a bad actor may be able to turn on the malicious device remotely from their user device (e.g., a smartphone) when they are within a wireless communication range (e.g., within the Bluetooth communication range) of the malicious device that is installed inside the fuel dispensing terminal. When the malicious device is turned on (or is otherwise operational), it manipulates the pulser rod to turn slower than the known speed.

When the pulser rod is manipulated to rotate slower than the predetermined and known speed, the meter component is also manipulated to measure a faulty fuel volume that is less than the actual fuel volume being dispensed from the nozzle of the fuel dispensing terminal. In other words, when the pulser rod is manipulated to rotate slower than the predetermined and known speed, the actual fuel amount that is being dispensed from the nozzle of the fuel dispensing terminal is higher than what the meter component measures. The reading of the meter component is displayed on the user interface and is used to measure how much fuel is being dispensed at a given time, e.g., every second, every five seconds, etc. In this manner, the bad actor can manipulate the fuel dispensing terminal by altering the fuel flow measurement without causing an alert in the current fuel dispensing systems. This manipulation degrades the operation and performance of components of the fuel dispensing terminal.

In some cases, the malicious device may damage the pulser rod, meter component, and/or other components of the fuel dispensing terminal. For example, the malicious device may reduce the half-life of the pulser rod, meter component, and/or other components of the fuel dispensing terminal. In some cases, one or more components of the fuel dispensing terminal may be physically damaged when the malicious device is being installed inside the housing of the fuel dispensing terminal. For example, a bad actor may damage an entrance lid and/or other components of the fuel dispensing terminal to access the interior of the fuel dispensing terminal to install the malicious device. In the same or another example, during the installation of the malicious device and/or during its operations, the bad actor or the malicious device may physically and/or operationally damage one or more components of the fuel dispensing terminal.

The disclosed system provides several technical solutions to the technical problems discussed above by implementing a technical solution for detecting anomalies at fuel dispensing terminals. For example, by detecting cases where a malicious device is used to manipulate a pulser rod, the anomalous (or malicious) fuel dispensing operation may be stopped before its completion (or even early in the process). In other words, in response to detecting cases of anomalous fuel dispensing operations where the fuel dispensing terminal is manipulated, the disclosed system is configured to automatically stop the fuel dispensing operation at the manipulated fuel dispensing terminal.

Accordingly, the system is integrated into a practical application of stopping, reducing, and/or preventing unauthorized access to fuel while the anomalous fuel dispensing operation is going on, in contrast to the existing fuel dispensing systems. This, in turn, provides an additional practical application of protecting and preserving fuel from unauthorized access.

In one embodiment, a system comprises a memory and a processor. The memory is configured to store a threshold volume per unit time parameter associated with fuel to be dispensed from a fuel dispensing terminal during a fuel dispensing operation. The threshold volume per unit time parameter is configurable. The memory is further configured to store a value indicating a threshold wait period. The processor is operably coupled with the memory. The processor detects a first fuel dispensing operation that indicates fuel is being dispensed from the fuel dispensing terminal. The processor performs the following operations at each predetermined interval from among a plurality of predetermined intervals within the threshold wait period. The processor determines an identifier value associated with a volume of fuel dispensed from the fuel dispensing terminal. The processor determines a measured volume per unit time parameter associated with fuel dispensed from the fuel dispensing terminal by dividing the determined identifier value by a unit parameter. The processor compares the measured volume per unit time parameter with the threshold volume per unit time parameter. The processor determines that the measured volume per unit time parameter is less than the threshold volume per unit time parameter. In response to determining that the measured volume per unit time parameter is less than the threshold volume per unit time parameter, the processor communicates an electronic signal to the fuel dispensing terminal that instructs the fuel dispensing terminal to stop dispensing fuel.

Detecting Locations Associated with Anomalous Fuel Dispensing Operations within a Network of Gas Stations The disclosed system contemplates a system and a method for detecting locations associated with anomalous fuel dispensing operations within a network of gas stations. The disclosed system is configured to detect an anomalous fuel dispensing operation while the anomalous fuel dispensing operation is going on as described above. The disclosed system is further configured to detect anomalous fuel dispensing operations after completion. In response to detecting an anomalous fuel dispensing operation, the disclosed system may perform the following operations to address the anomaly and reduce instances of such anomaly across a network of gas stations.

In response to detecting anomalous fuel dispensing operations across multiple gas stations within a network of gas stations, marked or tagged "hot spot" gas stations where most anomalous fuel dispensing operations that occur are detected. Therefore, the disclosed system provides comprehensive and valuable information to allocate more computer resources to the marked gas stations in order to further improve the security, efficiency, and quality of their operations. For example, in response to detecting a gas station that is a mark for bad actors to commit malicious fuel dispensing, the anomaly detection technology of the disclosed system may be implemented in a local controller and/or fuel dispensing terminals at the marked gas station. Accordingly, the disclosed system provides an additional practical application of improving computer resource allocation and utilization across a network of gas stations.

In this way, malicious attempts to affect fuel dispensing at the marked gas station may be detected and stopped mid-operation (or even early into the operation, e.g., a few seconds after the anomalous fuel dispensing starts). This will discourage bad actors from marking the gas station to commit malicious fuel dispensing in the future. Thereby, the security, efficiency, and quality of operation of such gas stations are improved.

Accordingly, the disclosed system is integrated into an additional practical application of improving the underlying operation of fuel dispensing systems in marked gas stations within the network of gas stations.

Furthermore, the disclosed system is integrated into an additional practical application of improving the underlying operation of fuel dispensing terminals. For example, as the number of anomalous fuel dispensing operations is reduced (by implementing the disclosed system), fewer malicious devices are installed (or even are attempted to be installed) inside the fuel dispensing terminals. This leads to fewer instances of physical damage and performance degradation of the components of the fuel dispensing terminals, which improves the half-life and underlying operations of the fuel dispensing terminals.

In response to detecting an anomalous fuel dispensing operation, the disclosed system may perform the following operations to address the anomaly to be pursued and investigated. The disclosed system retrieves a video feed that shows the fuel dispensing operation when and where the anomalous fuel dispensing operation occurred. For example, a gas station may include security cameras installed at different locations facing the fuel dispensing terminals. The cameras may capture a video feed of the fuel dispensing terminals. The disclosed system may retrieve the video feed from a camera that is facing the fuel dispensing terminal where the anomalous fuel dispensing operation has occurred. The disclosed system may create a file for the anomalous fuel dispensing operation. The disclosed system may store the video feed in the created file. The disclosed system may store other information in the created file, including user information associated with the anomalous fuel dispensing operation, vehicle information associated with a vehicle involved in the anomalous fuel dispensing operation, among others. The disclosed system may communicate the created file to authorities, a third party, and law enforcement to investigate the user, vehicle, and the anomalous fuel dispensing operation.

In one embodiment, a system comprises a memory and a processor. The memory is configured to store a threshold volume per unit time parameter associated with fuel to be dispensed from a fuel dispensing terminal during a fuel dispensing operation, where the threshold volume per unit time parameter is configurable. The processor is operably coupled with the memory. The processor determines an interaction period during which the fuel dispensing operation is performed at the fuel dispensing terminal. The processor determines a volume of fuel dispensed from the fuel dispensing terminal during the interaction period. The processor determines a measured volume per unit time parameter associated with fuel dispensed from the fuel dispensing terminal by dividing the determined volume of fuel by the interaction period. The processor compares the measured volume per unit time parameter with the threshold volume per unit time parameter. The processor determines that the measured volume per unit time parameter is less than the threshold volume per unit time parameter. In response to determining that the measured volume per unit time parameter is less than the threshold volume per unit time parameter, the processor determines a timestamp window associated with the fuel dispensing operation. The processor retrieves a video feed that shows the fuel dispensing terminal during the timestamp window, where the video feed is captured by a camera facing a space where the fuel dispensing terminal is located. The processor creates a file for the fuel dispensing operation. The processor stores the video feed in the file associated with the fuel dispensing operation.

Anomaly Detection During Fuel Dispending Operations Using Fuel Volume Determinations The disclosed system further contemplates a system and a method for anomaly detection during fuel dispensing operations using fuel volume determinations. In general, the disclosed system improves the techniques for detecting and validating anomalous fuel dispensing operations (or fuel dispensing operations suspected of an anomaly), and mitigating unauthorized access to fuel at a gas station while an anomalous fuel dispensing operation is going on, in contrast to the existing technology. In certain embodiments, the disclosed system is configured to leverage fuel levels at a fuel tank to validate whether a detection of an anomalous fuel dispensing operation is accurate or a false positive.

In an example scenario, assume that a method, such as detecting an unexpectedly slow fuel flow rate or any anomalous fuel dispensing detection technique was used for detecting an anomalous fuel dispensing operation (or fuel theft). The disclosed system is configured to use the detected slow fuel flow rate as a trigger to initiate a series of operations to validate (or confirm) the anomalous fuel dispensing operation. In an example operation, the disclosed system may access fuel inventory data that indicates fuel levels at the fuel tank. The fuel inventory data may represent fuel levels at the fuel tank for a past threshold period. The past threshold period may, for example, be thirty minutes, an hour, two hours, and the like. The disclosed system may determine the actual amount of fuel that left the fuel tank in the past threshold period based on the fuel inventory data. The disclosed system may also determine a calculated amount of fuel associated with one or more fuel dispensing operations in the past threshold period. The disclosed system may compare the actual amount of fuel that left the fuel tank in the past threshold period with the calculated amount of fuel in the same past threshold period. In one example, if it is determined that the actual amount of fuel that left the fuel tank is more than the calculated amount of fuel, the disclosed system may confirm that the fuel dispensing operation is anomalous, such as that fuel theft is occurring. In another example, if it is determined that the actual amount of fuel that left the fuel tank is more than the calculated amount of fuel and that the gap between the actual amount of fuel that left the fuel tank and the calculated amount of fuel is more than a predetermined volume, the disclosed system may confirm that the fuel dispensing operation is anomalous, such as that fuel theft is occurring. The predetermined volume may be any suitable volume that could be indicative of fuel theft based on, for example, historical data, the size of the fuel tank, the period of time in the threshold period, and the like. For example, historical data associated with prior instances of fuel theft at the fuel station may suggest that fuel theft is occurring when a certain volume discrepancy is found between the actual amount of fuel that is leaving the fuel tank and the calculated amount of fuel during the same threshold period. In an alternate example, the predetermined volume may be a certain fractional percentage of the overall size of the fuel tank that is indicative of fuel theft. In still another alternate example, the predetermined volume may be set based on the length of time elapsed in the threshold period of time (e.g., larger predetermined volume for a longer threshold period of time).

In certain embodiments, in response to confirming that the fuel dispensing operation is anomalous, the disclosed system may communicate an electronic signal to the fuel dispensing terminal that causes the fuel dispensing terminal to stop dispensing fuel. In certain embodiments, in response to confirming that the fuel dispensing operation is anomalous, the disclosed system may communicate a service message that indicates the fuel dispensing operation at the fuel dispensing terminal needs attention. The service message may be sent to a computing device associated with an on-site representative.

In certain embodiments, in response to confirming that the fuel dispensing operation is anomalous, the disclosed system may allow for the fuel dispensing operation to continue for a period of time. This operation may lead the bad actor who is performing or contributing to the anomalous fuel dispensing operation to continue their operation, stay at the fuel dispensing terminal, and not be alerted until authorities (such as law enforcement officers, representatives, etc.) arrive at the fuel dispensing terminal and question or even apprehend the bad actor.

In this manner, the disclosed system provides technical advantages and improvements in fuel dispensing operations at gas stations. Furthermore, the disclosed system provides the practical applications of detecting anomalous fuel dispensing operations and improving the accuracy in detecting and validating an anomalous fuel dispensing operation that was suspected based on a slow fuel flow rate, or any other suitable trigger.

In some cases, a single operation to determine whether a fuel dispensing operation is anomalous may not be sufficient with the large amount of data to process and may lead to false positive detections or even not detecting an anomalous fuel dispensing operation if the gap/margin between a calculated amount of fuel that was dispensed (that was determined based on manipulated slow fuel flow rate) and an actual amount of fuel that was dispensed is sufficiently small (e.g., smaller than the predetermined volume). The disclosed system and its operational flow provide a technical solution to this and other technical problems in the detection and validation of anomalous fuel dispensing operations currently arising in the field of fuel dispensing operations and fuel theft prevention at gas stations. In particular, the disclosed system provides an unconventional method to leverage fuel levels at the fuel tank to validate a suspected (or anomalous) fuel dispensing operation. In other words, the disclosed system provides a multi-validation technique for validating suspected (or anomalous) fuel dispensing operations to reduce false detections of anomalous fuel dispensing operations and increase the accuracy in the detections of anomalous fuel dispensing operations.

In certain embodiments, a system comprise a memory operably coupled to a processor. The memory is configured to store fuel inventory data that indicates levels of fuel in a fuel tank within a threshold period. The processor is configured to determine that a fuel dispensing operation at a fuel dispensing terminal may be anomalous. In response to determining that the fuel dispensing operation at the fuel dispensing terminal may be anomalous, the processor performs the following operations. The processor accesses the fuel inventory data. The processor determines a measured amount of fuel that left the fuel tank based at least in part upon the fuel inventory data. The processor determines a calculated amount of dispensed fuel associated with one or more fuel dispensing operations within the threshold period. The processor compares the measured amount of fuel that left the fuel tank with the calculated amount of dispensed fuel. The processor determines that the measured amount of fuel that left the fuel tank is more than the calculated amount of dispensed fuel. In response to determining that the measured amount of fuel that left the fuel tank is more than the calculated amount of dispensed fuel, the processor confirms that the fuel dispensing operation is anomalous. The processor communicates an electronic signal to the fuel dispensing terminal that causes the fuel dispensing terminal to stop dispensing fuel.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for anomaly detection at fuel dispensing terminals during fuel dispensing operations, after fuel dispensing operations, and detecting locations associated with anomalous fuel dispensing operations within a network of gas stations. Embodiments of the present disclosure and its advantages may be understood by referring to FIGS. 1A through 7. FIGS. 1A through 7 are used to describe systems and methods for anomaly detection at fuel dispensing terminals during fuel dispensing operations, after fuel dispensing operations, and detecting locations associated with anomalous fuel dispensing operations within a network of gas stations.

System Overview

Figure 1A:
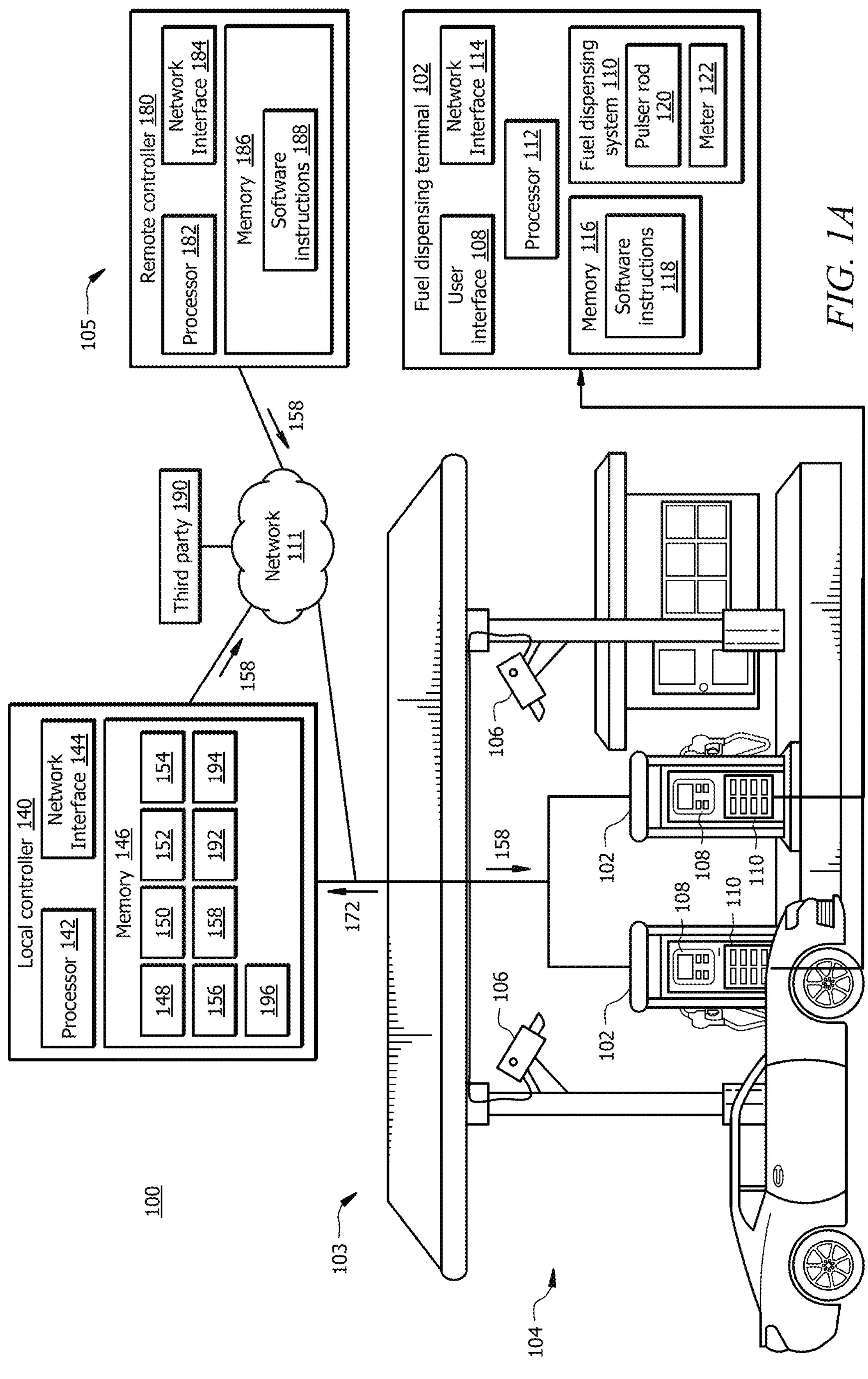
FIGS. 1A-1D illustrate an embodiment of a system configured to implement anomaly detection at fuel dispensing terminals.

FIGS. 1A-1D illustrate an embodiment of a system 100 that is generally configured to implement anomaly detection at fuel dispensing terminals 102 during and/or after fuel dispensing operations, and detecting locations associated with anomalous fuel dispensing operations within a network of gas stations. FIG. 1A illustrates components of the system 100. In certain embodiments, system 100 comprises one or more fuel dispensing terminals 102, a local controller 140, a remote controller 180, and a third party 190 communicatively coupled with one another via a network 111. Network 111 enables the communication between the components of the system 100.

Local controller 140 comprises a processor 142 in signal communication with a memory 146. Memory 146 stores software instructions 148 that when executed by the processor 142, cause the local controller 140 to perform one or more operations described herein. For example, when the software instructions 148 are executed, the local controller 140 may perform the following operations at each predetermined interval 196 from among a plurality of predetermined intervals 196 within a threshold wait period 154 for a fuel dispensing operation 160. In particular, the local controller 140 may determine an identifier value 194 associated with a volume of fuel 156 dispensed from the fuel dispensing terminal 102 during an interval 196. The local controller 140 may determine the measured fuel volume per unit time parameter 150 associated with fuel dispensed (and/or being dispensed) from the fuel dispensing terminal 102, where the measured fuel volume per unit time parameter 150 may be determined by dividing the identifier value 194 associated with the determined volume of fuel 156 by a unit parameter 192 (e.g., fuel cost per unit fuel volume). The local controller 140 may compare the measured fuel volume per unit time parameter 150 with the threshold fuel volume per unit time parameter 152. The local controller 140 may determine whether the measured fuel volume per unit time parameter 150 is less than the threshold fuel volume per unit time parameter 152. In response to determining that the measured fuel volume per unit time parameter 150 is less than the threshold fuel volume per unit time parameter 152, the local controller 140 may communicate an electronic signal 158 to the fuel dispensing terminal 102 that instructs the fuel dispensing terminal 102 to stop dispensing fuel. In response, the local controller 140 may determine that the fuel dispensing operation 160 is associated with an anomaly that indicates a discrepancy between the measured fuel volume per unit time parameter 150 and the threshold fuel volume per unit time parameter 152. In other words, the anomaly may indicate that the measured fuel volume per unit time parameter 150 is less than the threshold fuel volume per unit time parameter 152. In other embodiments, system 100 may not have all of the components listed and/or may have other elements instead of, or in addition to, those listed above.

Fuel dispensing terminal 102 comprises a processor 112 in signal communication with a memory 116. Memory 116 stores software instructions 118 that when executed by the fuel dispensing terminal 102, cause the fuel dispensing terminal 102 to perform one or more operations described herein. In certain embodiments, the operations described above in conjunction with the local controller 140 may be performed by the fuel dispensing terminal 102. For example, when the software instructions 118 are executed by the processor 112, the fuel dispensing terminal 102 may perform the operations described above in conjunction with the local controller 140 and the processor 112 may trigger the electronic signal 158 that includes instructions to stop dispensing fuel.

Figure 1B:
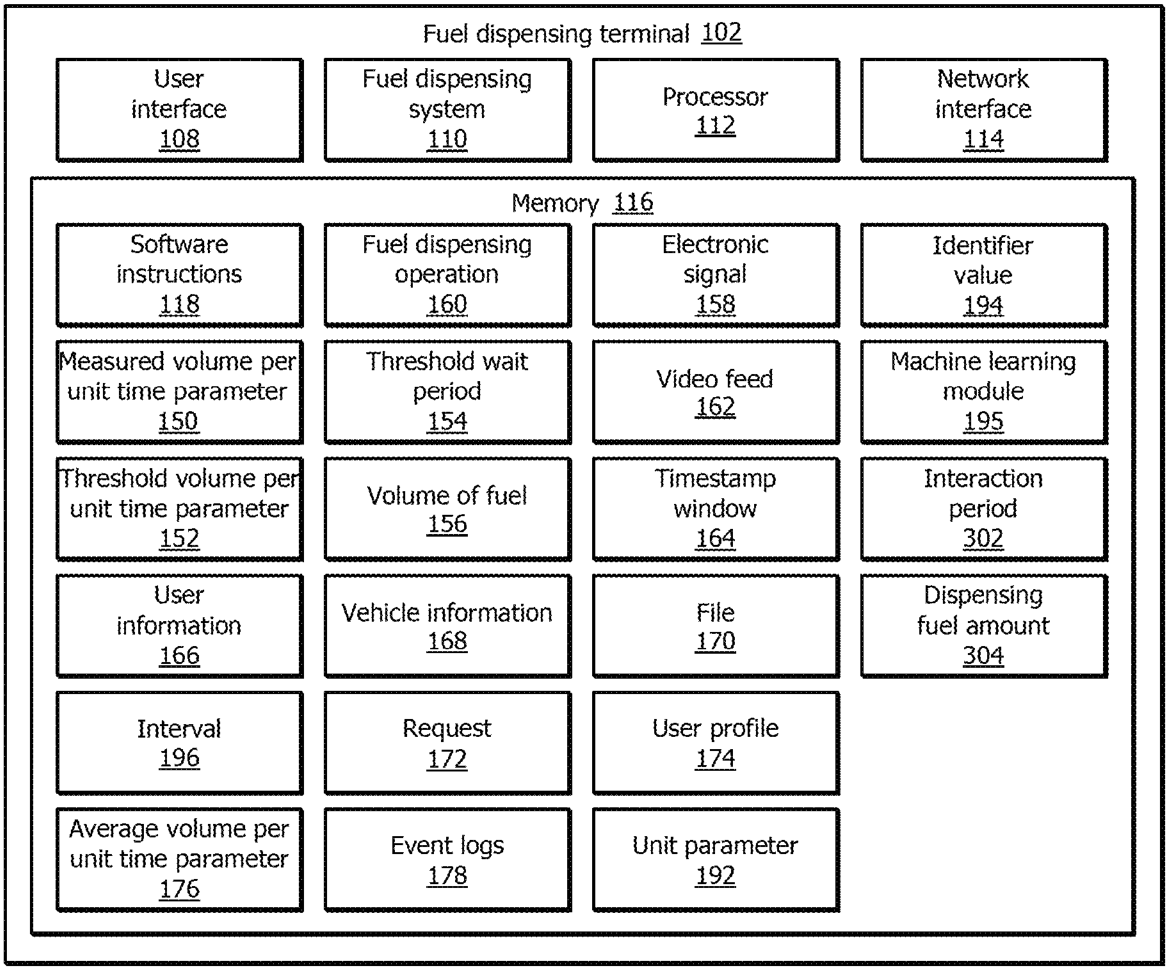
Figure 1C:
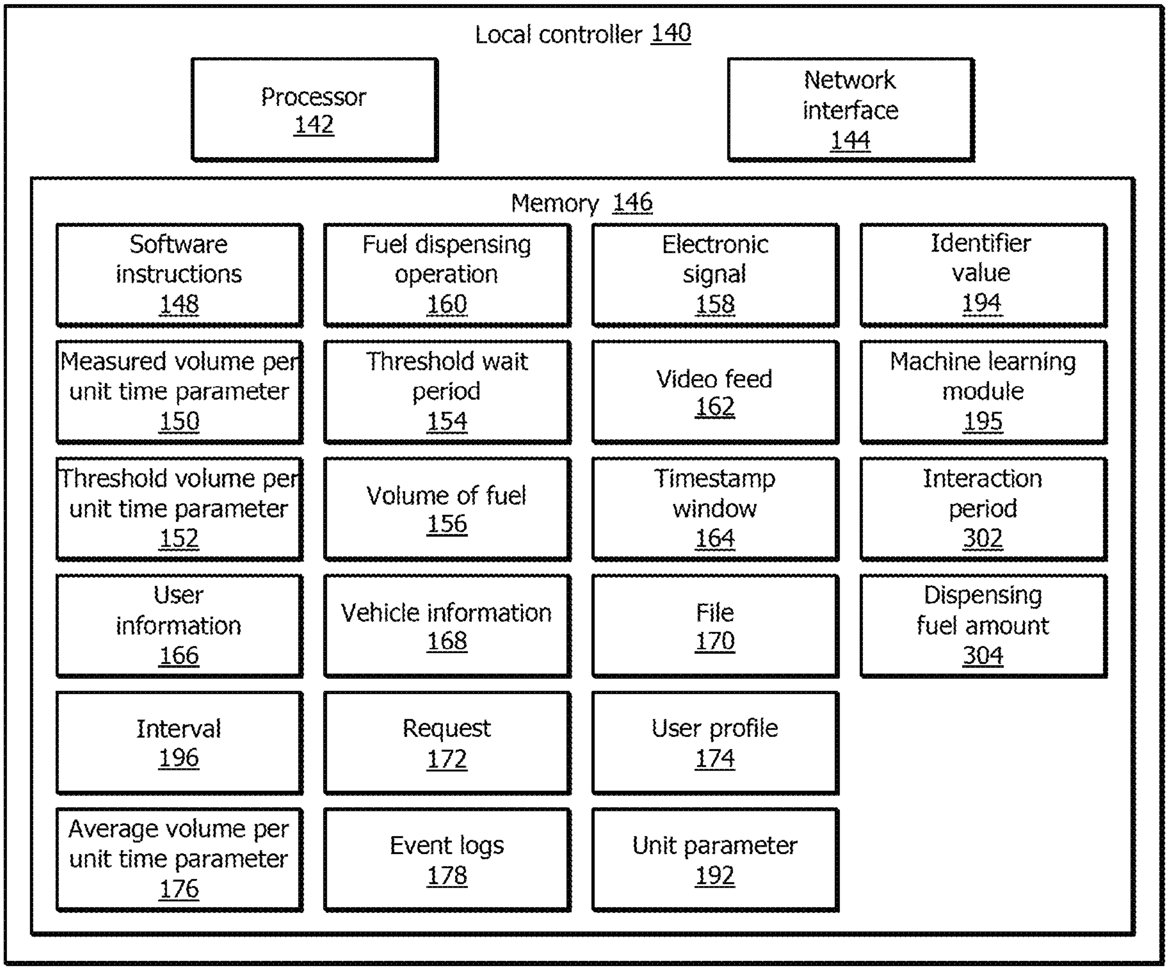
Figure 1D:
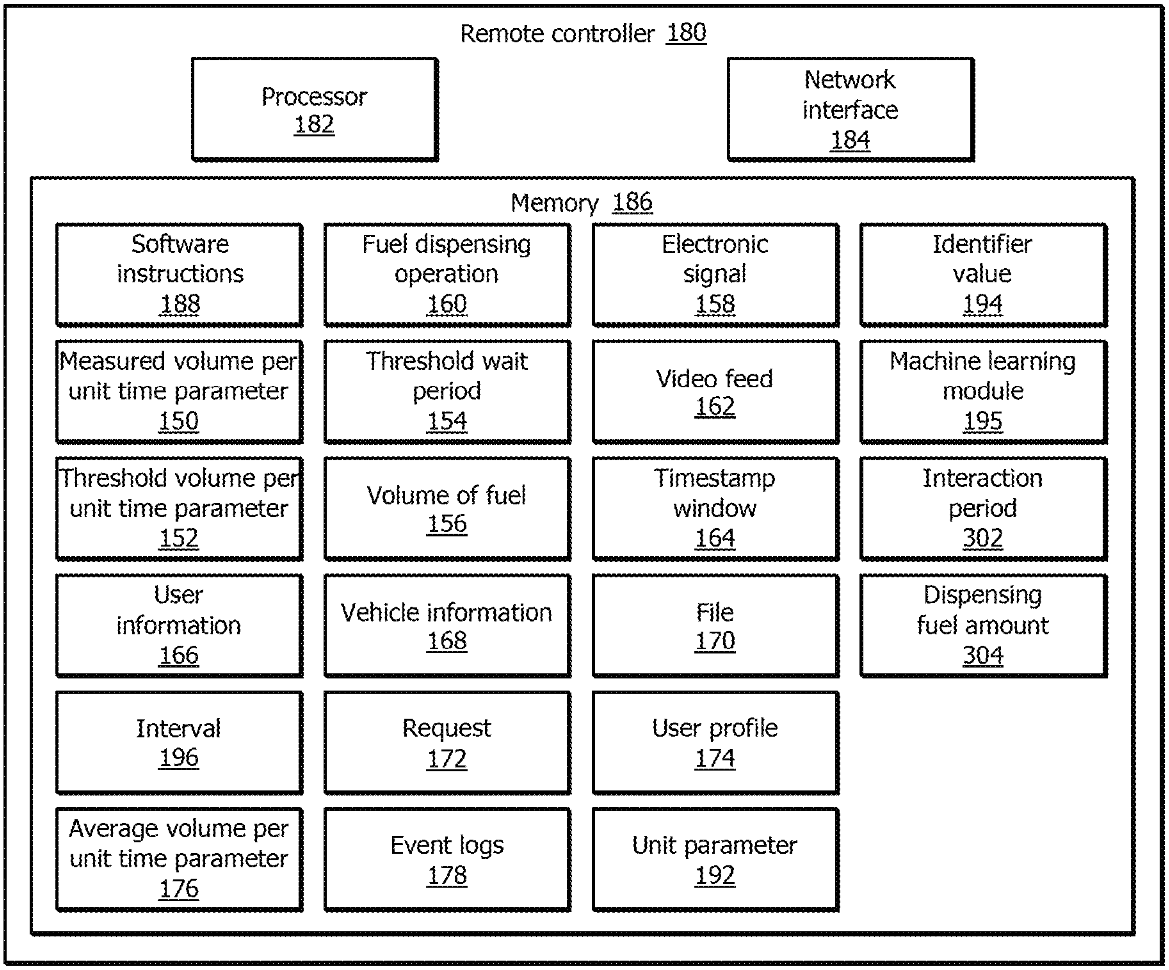

Remote controller 180 comprises a processor 182 in signal communication with a memory 186. Memory 186 stores software instructions 188 that when executed by the processor 182, cause the remote controller 180 to perform one or more operations described herein. In certain embodiments, the operations described above in conjunction with the local controller 140 may be performed by the remote controller 180. For example, when the software instructions 188 are executed by the processor 182, the remote controller 180 may perform the operations described above in conjunction with the local controller 140. FIG. 1B illustrates an example configuration of a fuel dispensing terminal 102. FIG. 1C illustrates an example configuration of a local controller 140. FIG. 1D illustrates an example configuration of a remote controller 180.

Conventional technology is not configured to detect an anomaly associated with a fuel dispensing terminal 102, where the anomaly may indicate a discrepancy between the measured volume per unit time parameter 150 and the threshold volume per unit time parameter 152. Conventional fuel dispensing terminals 102 have a pulser rod component 120 that is configured to rotate when fuel is dispensed from the fuel dispensing terminal 102. As the pulser rod 120 rotates, it turns mechanical gears of a meter component 122 that is configured to measure and determine how much fuel is being dispensed at a given timestamp.

When a user starts pumping fuel from a fuel dispensing terminal 102 into a vehicle, the pulser rod 120 located within the fuel dispensing terminal 102 starts to rotate, which in turn, rotates the gears of the meter component 122. This fuel amount is shown on a user interface 108 on the fuel dispensing terminal 102 and transmitted to a computing device in a physical location (e.g., gas station 104) to display how much fuel a user is dispensing from the fuel dispensing terminal 102.

The fuel dispensing system 110 within the fuel dispensing terminal 102 is pressurized at a constant pressure. This causes the fuel flow rate from a nozzle of the fuel dispensing terminal 102 to be constant regardless of how fast or slow the pulser rod 120 is rotating. A bad actor may manipulate the pulser rod 120 to turn slower than a predetermined and known speed. For example, a malicious device may be installed adjacent to the pulser rod 120 that causes the pulser rod 120 to rotate slower than the known speed. The malicious device may be a mechanical device, for example. In the same or another example, the malicious device may be an electronic device that includes microchips, processors, and/or circuit boards that can be controlled remotely via wireless communication, e.g., Bluetooth and the like. For example, a bad actor may be able to turn on the malicious device remotely from their user device (e.g., a smartphone) when they are within a wireless communication range (e.g., within the Bluetooth communication range) of the malicious device that is installed inside the fuel dispensing terminal 102. When the malicious device is turned on (or is otherwise operational), it manipulates the pulser rod 120 to turn slower than the known speed.

When the pulser rod 120 is manipulated to rotate slower than the predetermined and known speed, the meter component 122 is also manipulated to determine a faulty fuel volume that is less than the actual fuel volume being dispensed from the nozzle of the fuel dispensing terminal 102. In other words, when the pulser rod 120 is manipulated to rotate slower than the predetermined and known speed, the actual fuel amount that is being dispensed from the nozzle of the fuel dispensing terminal 102 is higher than what the meter component 122 determines (i.e., the actual fuel amount that is being dispensed from the nozzle of the fuel dispensing terminal 102 exceeds the faulty fuel amount that the meter component 122 determines). In this manner, the bad actor can manipulate the fuel dispensing terminal 102 by altering the fuel flow measurement by the meter component and without causing an alert in the current fuel dispensing systems. This manipulation degrades the operation and performance of components of the fuel dispensing terminal 102.

In some cases, the malicious device may damage the pulser rod 120, meter component 122, and/or other components of the fuel dispensing terminal 102. For example, the malicious device may reduce the half-life of the pulser rod 120, meter component 122, and/or other components of the fuel dispensing terminal 102.

In some cases, one or more components of the fuel dispensing terminal 102 may be damaged when the malicious device is being installed inside the housing of the fuel dispensing terminal 102. For example, a bad actor may damage an entrance lid to the interior of the fuel dispensing terminal 102 to be able to install the malicious device. In the same or another example, during the installation of the malicious device and/or during its operations, it may physically and/or operationally damage one or more components of the fuel dispensing terminal 102.

The system 100 is configured to detect cases where the pulser rod 120 is manipulated to turn slower than the known or expected speed. The system 100 provides several technical solutions to the technical problems discussed above by implementing a technical solution for detecting anomalies at fuel dispensing terminals 102.

For example, by detecting cases where a malicious device is used to manipulate a pulser rod 120, the malicious fuel dispensing operation may be stopped before its completion (or even early in the process).

Thus, the system 100 may reduce (or prevent) unauthorized access to the fuel dispensing terminal 102 and fuel by communicating the electronic signal 158 to the fuel dispensing terminal 102 that instructs the fuel dispensing terminal 102 to stop dispensing fuel. Accordingly, the system 100 is integrated into a practical application of stopping, reducing, and/or preventing fuel loss while the malicious fuel dispensing operation is ongoing. This, in turn, provides an additional practical application of protecting and preserving fuel from unauthorized access. In the present disclosure, a malicious fuel dispensing operation may interchangeably be referred to as an anomalous fuel dispensing operation.

The system 100 further provides an additional practical application of improving the underlying operations of fuel dispensing systems 110. For example, by detecting malicious fuel dispensing operations across multiple fuel stations 104, tagged or marked "hot spot" gas stations 104 where an anomalous number of malicious fuel dispensing operations 160 occur are detected. Therefore, system 100 provides valuable information to allocate more computer resources to the marked gas stations 104 in order to further improve the security of their operations. For example, in response to detecting a gas station 104 that is a mark for bad actors to commit malicious fuel dispensing, the anomaly detection technology of system 100 disclosed herein may be implemented in a local controller 140 (and/or remote controller 180 and/or fuel dispensing terminals 102) at the marked gas station 104. In this way, malicious attempts of fuel dispensing at the marked fueling station 104 may be detected and stopped mid-operation (or even early into the operation, e.g., after a few seconds after the malicious fuel dispensing starts). This may discourage bad actors from marking gas station 104 to commit malicious fuel dispensing. Accordingly, the system 100 is integrated into an additional practical application of improving computer resource allocation efficiency across a network of gas stations 104 to gas stations 104 that need the computer resources the most.

Furthermore, the system 100 is integrated into an additional practical application of improving the underlying operation of fuel dispensing terminals 102. For example, as the number of malicious fuel dispensing operations is reduced (by implementing the system 100), fewer malicious devices are installed (or even are attempted to be installed) inside the fuel dispensing terminals 102. This leads to less (or minimized) physical and operational damage to the components of the fuel dispensing terminals 102.

In certain embodiments, the local controller 140 may be the end-point device that is configured to perform the anomaly detection process and determine whether there is a discrepancy between the measured fuel volume per unit time parameter 150 and the threshold fuel volume per unit time parameter 152, similar to that briefly described above and described in greater detail further below in conjunction with operational flow 200 in FIG. 2 and operational flow 300 in FIG. 3.

In certain embodiments, the remote controller 180 may be the end-point device that is configured to perform the anomaly detection process and determine whether there is a discrepancy between the measured fuel volume per unit time parameter 150 and the threshold fuel volume per unit time parameter 152.

In certain embodiments, the fuel dispensing terminal 102 may be the end-point device that is configured to perform the anomaly detection and determine whether there is a discrepancy between the measured fuel volume per unit time parameter 150 and the threshold fuel volume per unit time parameter 152.

System Components

Fuel Dispenser Terminals

The fuel dispenser terminals 102 are located at a first location 103. For example, the fuel dispenser terminals 102 may be located on the property of a gas station or a fueling station 104. The fuel dispenser terminals 102 are configured to dispense fuel to a user and to communicate information between the user and the local controller 140 (or remote controller 180). An example of the fuel dispenser terminal 102 in operation is described in FIGS. 2 and 3. In the present disclosure, the fuel dispensing terminal 102 may be interchangeably referred to as a fuel dispenser device.

A fuel dispenser terminal 102 comprises a user interface 108, a fuel dispensing system 110, a processor 112, a network interface 124, and a memory 116. The components of the fuel dispensing terminal 102 are operably coupled with one another using any suitable type of wired or wireless connection.

The user interface 108 is typically located on the top half of the fuel dispensing terminal 102 to be more accessible for user interaction. However, in some cases, the user interface 108 may be located in any other suitable location on the fuel dispensing terminal 102. The user interface 108 has components with which a user can interact. The user interface 108 may include a display screen, a keypad, a touch pad, buttons, card readers, card scanners, any suitable components, or any number and combination of suitable components. A user may initiate a request for fuel to be dispensed from the fuel dispenser terminal 102 by presenting a document (e.g., a card) to the user interface 108. The document is scanned by the user interface 108. The information from the document may be transmitted to the local controller 140, a computing device monitored by personnel at fuel station 104, and/or the remote controller 180, for validation. If the information is verified, the request of the user is granted.

The user interface 108 is configured to send control signals to the fuel dispensing system 110 to control how fuel is dispensed to a user. For example, the user interface 108 may be configured to send a service request 172 to request a fuel service for the user. For example, a user may request a fuel service by providing their card information to the fuel dispenser terminal 102 by swiping or inserting their card into the fuel dispenser terminal 102. In response to sending a service request 172, the user may receive an authorization token that indicates the user has been approved for fuel service. In other words, receiving an authorization token indicates that the fuel dispenser terminal 102 is authorized to dispense fuel to the user. The user interface 108 is further configured to send control signals to the fuel dispensing system 110 to control the flow of fuel to the user in response to receiving the authentication token.

The user interface 108 is further configured to exchange information between a user and the local controller 140. The user interface 108 is in signal communication with the local controller 140 using any suitable type of wired or wireless connection. For example, the user interface 108 and the local controller 140 may be in signal communication with each other using an Ethernet cable or WiFi connection, e.g., via network 111. The user interface 108 is configured to send a service request 172 to the remote controller 180 to request information and to present the requested information to the user.

When the fuel flow starts from a nozzle of the fuel dispensing terminal 102, the fuel flow rate and the cost of fuel service (e.g., at certain intervals, such as every five seconds, every six seconds, and the like) are determined by a meter component 122 (alone or in combination with other components) inside the housing of the fuel dispensing terminal 102. This information may be communicated from the fuel dispensing terminal 102 to the local controller 140.

The local controller 140 may use this information to determine the measured fuel volume per unit time parameter 150 and threshold fuel volume per unit time parameter 152, and determine whether there is a discrepancy between those parameters 150 and 152. This operation is described in greater detail further below in conjunction with operational flow 200 in FIG. 2 and operational flow 300 in FIG. 3.

The user interface 108 is further configured to exchange information between a user and the remote controller 180. The user interface 108 is in signal communication with the remote controller 180 using the network 111. The user interface 108 is further configured to exchange information between a user and the third party 190. The user interface 108 is in signal communication with the third party 190 using the network 111. The third party 190 may include authorities, law enforcement, and the like.

The user interface 108 may comprise a display, speakers, a printer, buttons, switches, keypads, touchscreens, touchpads, card readers, microphones, camera (e.g., camera 106), a network interface (e.g., network interface 114), or any other suitable type of hardware.

The fuel dispensing system 110 is typically located at the bottom half of the fuel dispensing terminal 102 to connect to fuel pipes and/or a fuel storage tank underground. However, in some cases, the fuel dispensing system 110 may be located in any other suitable location on the fuel dispensing terminal 102. The fuel dispensing system 110 may comprise hydraulics, pumps, motors, piping, a ventilation system, switches, electronics, any other suitable components, or any suitable number and combination of components. The fuel dispensing system 110 is configured to control how fuel is dispensed out of a nozzle of the fuel dispensing terminal 102 to a user based on control signals from the user interface 108. For example, the fuel dispensing system 110 may be configured to receive a first control signal that triggers the fuel dispensing system 110 to initiate a flow of fuel to a user, and a second control signal that triggers the fuel dispensing system 110 to terminate the flow of fuel to the user. The fuel dispensing system 110 may be configured to implement any suitable protocol for dispensing fuel.

Processor 112 comprises one or more processors operably coupled to the memory 116. The processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 112 may be a programmable logic device, a microcontroller, a microprocessor, or any suitable number and combination of the preceding. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 118) to implement the processor 112. In this way, processor 112 may be a special-purpose computer designed to implement the functions disclosed herein. In an embodiment, the processor 112 is implemented using logic units, FPGAs, ASICs, DSPs, or any other suitable hardware. The processor 112 is configured to operate as described in FIGS. 1A-7. For example, the processor 112 may be configured to perform one or more operations of method 400 as described in FIG. 4, and one or more operations of method 500 as described in FIG. 5.

Network interface 114 is configured to enable wired and/or wireless communications. The network interface 114 may be configured to communicate data between the fuel dispensing terminal 102 and other devices, systems, or domains, such as the local controller 140, the remote controller 180, and the third party 190. For example, the network interface 114 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 112 may be configured to send and receive data using the network interface 114. The network interface 114 may be configured to use any suitable type of communication protocol.

The memory 116 may be volatile or non-volatile and may comprise read-only memory (ROM), random-access memory (RAM), ternary content-addressable memory (TCAM), dynamic random-access memory (DRAM), and static random-access memory (SRAM). The memory 116 may include one or more of a local database, cloud database, network-attached storage (NAS), etc. The memory 116 comprises one or more disks, tape drives, or solid-state drives, and may be used as an over-flow data storage device, to store programs when such programs are selected for execution, and to store instructions and data that are read during program execution. The memory 116 may store any of the information described in FIGS. 1A-7 along with any other data, instructions, logic, rules, or code operable to implement the function(s) described herein when executed by processor 112. Referring to FIG. 1B, the memory 116 may store software instructions 118, the measured volume per unit time parameter 150, the threshold volume per unit time parameter 152, threshold wait period 154, volume of fuel 156, electronic signals 158, fuel dispensing operation 160, video feed 162, timestamp window 164, user information 166, vehicle information 168, file 170, service request 172, user profile 174, average volume per unit time parameter 176, event logs 178, unit parameter 192, an identifier value 194, machine learning algorithm 195, interaction period 302, dispended fuel amount 304, and/or any other data or instructions. The software instructions 118 may comprise any suitable set of instructions, logic, rules, or code operable to execute the processor 112 and perform the functions described herein, such as some or all of those described in FIGS. 1A-7. The measured fuel volume per unit time parameter 150 may represent a measured amount of fuel pumped per unit time (e.g., per minute, per second, per five seconds, etc.) by the meter 122. The threshold volume per unit time parameter 152 may be configurable and indicate a minimum fuel volume per unit time (e.g., per minute, per second, per five seconds, etc.), such that if the measured fuel volume per unit time parameter 150 is less than the threshold volume per unit time parameter 152, it is determined that the fuel dispensing operation 160 is anomalous. The threshold wait period 154 may be configurable. The threshold wait period 154 may depend on historical fuel dispensing operations and historical periods of time it took to determine whether historical fuel dispensing operations are anomalous. The volume of fuel 156 indicates an amount of fuel dispensed from a fuel dispensing terminal 102. The volume of fuel 156 may be in gallons, liters, and the like. The electronic signal 158 may include instructions to turn off a fuel dispensing terminal 102 and/or close valves of a fuel dispensing terminal 102. The unit parameter 192 may represent fuel cost per unit fuel volume (e.g., fuel cost per gallon, fuel cost per liter, etc.). The identifier value 194 may represent a cost for a volume of fuel dispensed from a fuel dispensing terminal 102.

Camera

Referring back to FIG. 1A, the gas station 104 may include and/or be associated with one or more cameras 106.

For example, one or more cameras 106 may be installed at different locations of the gas station 104 for monitoring the fuel dispensing terminals 102 and their operations. The cameras 106 may face the space where the fuel dispensing terminals 102 are located. In certain embodiments, each fuel dispensing terminal 102 may include a camera 106, and the camera 106 is configured to capture a video feed 162 of an environment in front (and around) of the fuel dispensing terminal 102 to record the fuel dispensing operations 160.

Camera 106 may be or include any camera that is configured to capture videos and images of a field of view in front of it. Examples of the camera 106 may include charge-coupled device (CCD) cameras and complementary metal-oxide semiconductor (CMOS) cameras. The camera 106 may be configured to capture a video feed 162 (and/or an image feed 162) of the space where the fuel dispensing terminal 102 is located. The camera 106 is a hardware device that is configured to capture videos and images continuously, at predetermined intervals, or on-demand. The cameras 106 are communicatively coupled to the components of the system 100, including the local controller 140, remote controller 180, and the fuel dispensing terminals 102 via the network 111.

The camera 106 is configured to communicate the captured video feed 162 to the local controller 140. The local controller 140 may use the captured video feed 162 in detecting users and vehicles involved in malicious fuel dispensing operations where a pulser rod 120 is manipulated to turn slower than the known speed to fabricate a faulty fuel dispensing flow rate that is lower than the actual fuel flow rate out of the nozzle of the fuel dispensing terminal 102. The camera 106 is configured to communicate the captured video feed 162 to any other components of the system 100, including the remote controller 180. For example, the remote controller 180 may use the captured video feed 162 in detecting users and vehicles involved in malicious fuel dispensing operations. The camera 106 is configured to communicate the captured video feed 162 to the fuel dispensing terminal 102. For example, the fuel dispensing terminal 102 may use the captured video feed 162 in detecting users and vehicles involved in malicious fuel dispensing operations. The operation of leveraging the captured video feed 162 is described in greater detail in FIG. 2 in conjunction with the operational flow 200 and FIG. 3 in conjunction with the operational flow 300.

Network

Network 111 may be any suitable type of wireless and/or wired network. The network 111 is not connected to the Internet or public network. The network 111 may include all or a portion of an Intranet, a peer-to-peer network, a switched telephone network, a LAN, a WAN, a MAN, a PAN, a PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network that is not connected to the Internet. The network 111 may be configured to support any suitable type of communication protocol as would be appreciated by one of ordinary skill in the art.

Local Controller

Local controller 140 is located at the first location 103. The local controller 140 may be any suitable network device or server (e.g., a client or proxy server) configured to communicate data with the fuel dispensing terminals 102, the remote controller 180, and the third party 190. The local controller 140 may be formed by one or more physical devices configured to provide services and resources (e.g., data and/or hardware resources) for the fuel terminal devices 102 located at the first location 103.

In certain embodiments, the local controller 140 may communicate data received from the fuel dispensing terminal 102 to the remote controller 180. In other words, the local controller 140 may communicate data between the fuel dispenser terminals 102 and the remote controller 180. For example, the local controller 140 may be a proxy server that acts as an intermediary for exchanging data between fuel dispenser terminals 102 and the remote controller 180. An example of the local controller 140 in operation is described in FIGS. 2 and 3. The local controller 140 and the remote controller 180 may be in signal communication with each other over a network 111.

The local controller 140 comprises a processor 142 operably coupled with a network interface 144 and a memory 146. Processor 142 comprises one or more processors operably coupled to the memory 146. The processor 142 is any electronic circuitry, including, but not limited to, state machines, one or CPU chips, logic units, cores (e.g., a multi-core processor), FPGAS, ASICs, or DSPs. For example, one or more processors may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the processor 142. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1A-7. For example, the processor 142 may be configured to perform one or more operations of method 400 as described in FIG. 4, and one or more operations of method 500 as described in FIG. 5.

Network interface 144 is configured to enable wired and/or wireless communications. The network interface 144 may be configured to communicate data between the local controller 140 and other devices, systems, or domains, such as the remote controller 180, the fuel dispensing terminals 102, and the third party 190. For example, the network interface 144 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise ROM, RAM, TCAM, DRAM, and SRAM. The memory 146 may include one or more of a local database, cloud database, NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1A-7 along with any other data, instructions, logic, rules, or code operable to implement the function(s) described herein when executed by processor 142. Referring to FIG. 1C, the memory 146 may store software instructions 148, the measured volume per unit time parameter 150, the threshold volume per unit time parameter 152, threshold wait period 154, volume of fuel 156, electronic signals 158, fuel dispensing operation 160, video feed 162, timestamp window 164, user information 166, vehicle information 168, file 170, service request 172, user profile 174, average volume per unit time parameter 176, event logs 178, unit parameter 192, an identifier value 194, machine learning algorithm 195, interaction period 302, dispended fuel amount 304, and/or any other data or instructions. The software instructions 148 may comprise any suitable set of instructions, logic, rules, or code operable to execute the processor 142 and perform the functions described herein, such as some or all of those described in FIGS. 1A-7. Other elements are described with respect to FIGS. 1A, 1B, and 2-5.

Remote Controller

The remote controller 180 is located at a second location 105 that is remote (e.g., geographically different) from the first location 103. The remote controller 180 may be any suitable network device or server.

In certain embodiments, the remote controller 180 may be implemented by a cluster of computing devices located in a remote server farm. For example, the remote controller 180 may be implemented by a plurality of computing devices using distributed computing and/or cloud computing systems. The remote controller 180 may be implemented by a plurality of computing devices in one or more data centers. The remote controller 180 may be formed by one or more physical devices configured to provide services and resources (e.g., data and/or hardware resources) for the system 100.

The remote controller 180 comprises a processor 182 operably coupled with a network interface 184 and a memory 186. Processor 182 comprises one or more processors operably coupled to the memory 186. The processor 182 is any electronic circuitry, including, but not limited to, state machines, one or CPU chips, logic units, cores (e.g., a multi-core processor), FPGAs, ASICs, or DSPs. For example, one or more processors may be implemented in cloud devices, servers, virtual machines, and the like. The processor 182 may be a programmable logic device, a microcontroller, a microprocessor, or any suitable combination of the preceding. The one or more processors are configured to process data and may be implemented in hardware or software. For example, the processor 182 may be 8-bit, 16-bit, 32-bit, 64-bit, or of any other suitable architecture. The processor 182 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 188) to implement the processor 182. In this way, processor 182 may be a special-purpose computer designed to implement the functions disclosed herein. In an embodiment, the processor 182 is implemented using logic units, FPGAs, ASICs, DSPs, or any other suitable hardware. The processor 182 is configured to operate as described in FIGS. 1A-7. For example, the processor 182 may be configured to perform one or more operations of method 400 as described in FIG. 4, and one or more operations of method 500 as described in FIG. 5.

Network interface 184 is configured to enable wired and/or wireless communications. The network interface 184 may be configured to communicate data between the remote controller 180 and other devices, systems, or domains, such as the local controller 140, the fuel dispensing terminals 102, and the third party 190. For example, the network interface 184 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 182 may be configured to send and receive data using the network interface 184. The network interface 184 may be configured to use any suitable type of communication protocol.

The memory 186 may be volatile or non-volatile and may comprise ROM, RAM, TCAM, DRAM, and SRAM. The memory 186 may include one or more of a local database, cloud database, NAS, etc. The memory 186 comprises one or more disks, tape drives, or solid-state drives, and may be used as an overflow data storage device, to store programs when such programs are selected for execution, and to store instructions and data that are read during program execution. The memory 186 may store any of the information described in FIGS. 1A-7 along with any other data, instructions, logic, rules, or code operable to implement the function(s) described herein when executed by processor 182. Referring to FIG. 1D, the memory 186 may store software instructions 188, the measured volume per unit time parameter 150, the threshold volume per unit time parameter 152, threshold wait period 154, volume of fuel 156, electronic signals 158, fuel dispensing operation 160, video feed 162, timestamp window 164, user information 166, vehicle information 168, file 170, service request 172, user profile 174, average volume per unit time parameter 176, event logs 178, unit parameter 192, an identifier value 194, machine learning algorithm 195, interaction period 302, dispended fuel amount 304, and/or any other data or instructions. The software instructions 188 may comprise any suitable set of instructions, logic, rules, or code operable to execute the processor 182 and perform the functions described herein, such as some or all of those described in FIGS. 1A-7. Other elements are described with respect to FIGS. 1A, 1B, and 2-5.

The remote controller 180 is configured to provide instructions for operating and maintaining the fuel dispenser terminals 102. For example, the remote controller 180 may be configured to store and upload software instructions 118 (e.g., included in configuration files) to the fuel dispenser terminals 102. Software instructions 118 comprise instructions for configuring the hardware and/or software of a fuel dispenser terminal 102. Examples of software instructions 118 include, but are not limited to, firmware updates, BIOS updates, and software updates. The remote controller 180 may be configured to upload software instructions 118 to one or more fuel dispenser terminals 102 periodically or on-demand. The remote controller 180 may be configured to upload updated software instructions 118 to fuel dispenser terminals 102 in response to detecting anomalous fuel dispensing operations at the same or different fuel dispensing terminals 102 at the gas station 104.

For example, the remote controller 180 may provide updated software instructions 118 to be installed on the processor 112 of the fuel dispensing terminal 102 that when executed by the processor 112, causes the processor 112 to implement the anomaly detection technology described herein, i.e., determine whether there is a discrepancy between the measured fuel volume per unit time parameter 150 and the threshold fuel volume per unit time parameter 152 for a given fuel dispensing operation 160, and in response to detecting the discrepancy that indicates the measured fuel volume per unit time parameter 150 is less than the threshold fuel volume per unit time parameter 152, instruct the fuel dispensing terminal 102 to perform one or more operations. For example, the one or more operations may include communicating an electronic signal 158 that instructs the fuel dispensing terminal 102 to stop dispensing fuel; retrieving a video feed 162 that shows the space where the fuel dispensing terminal 102 is located during a timestamp window of the fuel dispensing operation 160; retrieving user information 166 from a card data provided by a user; retrieving vehicle information 168 from the video feed 162; generating a file 170, including the video feed 162, user information 166, vehicle information 168, and/or any other suitable information in the file 170; and communicating the file 170 to third parties 190 for investigating the malicious fueling dispensing operation 160. The third party 190 may include authorities, law enforcement, and the like. These operations are described in greater detail in conjunction with operational flow 200 in FIG. 2 and operational flow 300 in FIG. 3.

The remote controller 180 may be configured to download and store event logs 178 from the fuel dispenser terminals 102. Event logs 178 comprise information about the operation history of the fuel dispenser terminals 102. For instance, event logs 178 may comprise information about a quantity of fuel dispensed, volume of fuel 156 dispensed per interval 196, card data used in conjunction with initiating a service request 172, timestamp durations for fuel dispensing operations 160 at the fuel dispenser terminals 102, fuel flow rates, video feeds 162, and/or any other type of information associated with the fuel dispenser terminals 102. The remote controller 180 may be configured to periodically request and/or receive event log information. For instance, the remote controller 180 may be configured to receive event log information every thirty seconds, every minute, every thirty minutes, every hour, or at any suitable time interval.

The remote controller 180 may be configured to receive a request 172 when a user starts to operate a fuel dispensing terminal 102 to dispense fuel. The user may provide their card data to the fuel dispensing terminal 102 or to personnel at the gas station 104. The user may provide their card data physically or from their mobile device. The user's request 172 may include user information 166 associated with the user. The user information 166 may include a name, an address, and a number (e.g., a card number) associated with the user.

The user request 172 is sent to the local controller 140 to request a fuel service for the user. The local controller 140 is configured to identify the user information 166 associated with the user in the user request 172 from the card data.

The local controller 140 is configured to use the user information 166 to determine the identity of the user. For example, the local controller 140 may use the user information 166 to identify a user profile 174 associated with the user. The local controller 140 may use the user information 166 to search for a user profile 174 that contains matching user information 166. The user profile 174 may further comprise other information associated with a user. For example, a user profile 174 may comprise personal information, card information, interaction history information, alternative identifiers, or any other suitable type of information associated with a user. In response to validating the identity of the user, the user request 172 may be granted and the user may be able to start a fuel dispensing operation 160 at the fuel dispensing terminal 102.

In certain embodiments, the operations of verifying the identity of the user may be performed by any suitable number and combination of the fuel dispensing terminal 102, the local controller 140, and the remote controller 180. In particular, although the above operations are described as being performed by the local controller 140, it should be understood that they may be alternately or additionally be performed by the remote controller 180, the fuel dispensing terminal 102, or any suitable number and combination of these components.

Figure 2:
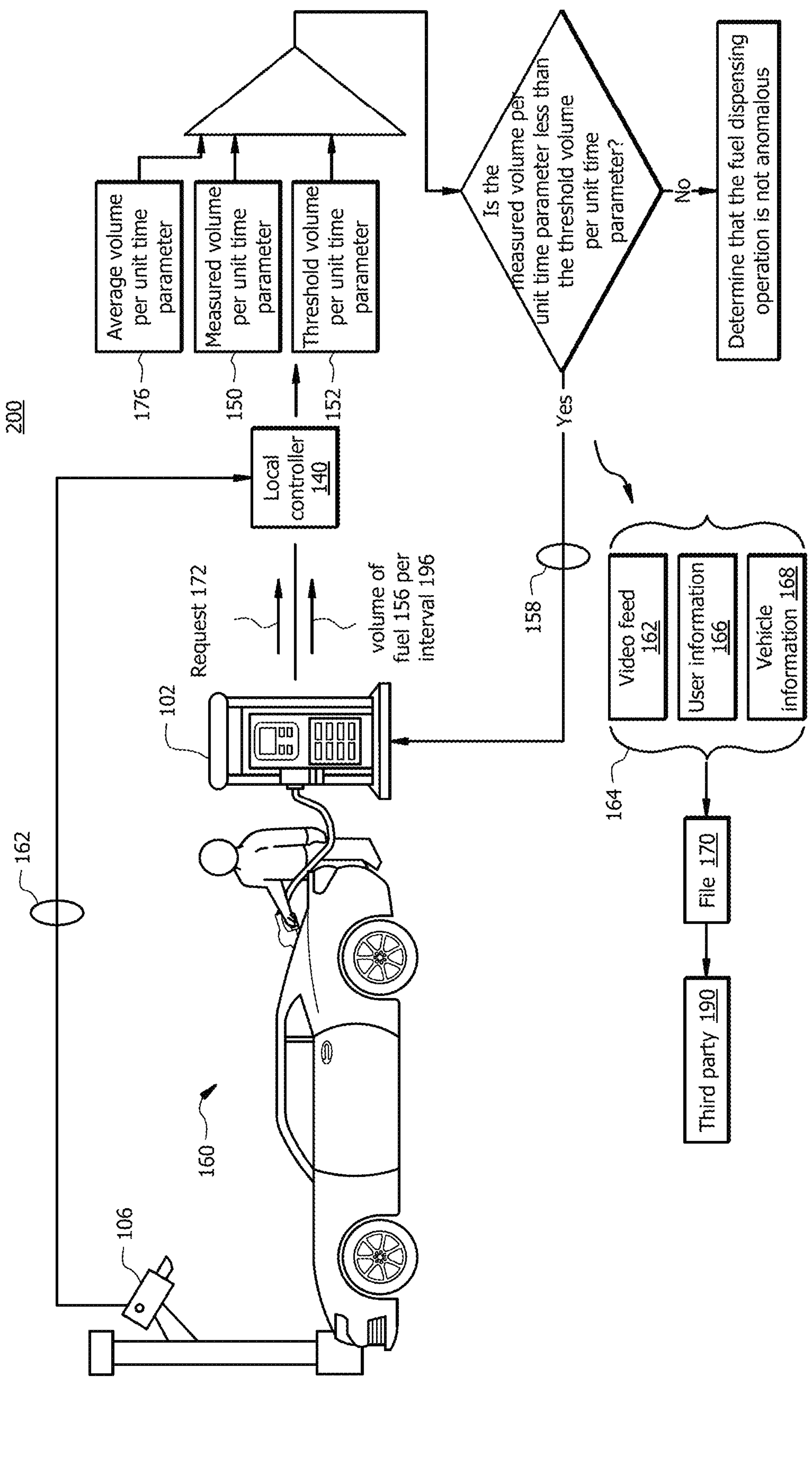
FIG. 2 illustrates an example operational flow of the system of FIG. 1A to implement anomaly detection at a fuel dispensing terminal while a fuel dispensing operation is ongoing.

Example Operational Flow for Anomaly Detection During Fuel Dispensing Operations FIG. 2 illustrates an example operational flow 200 of system 100 of FIG. 1A for anomaly detection during fuel dispensing operations 160 at fuel dispensing terminals 102. The anomaly may indicate a malicious attempt to manipulate components (e.g., pulser rod 120) of the fuel dispensing terminal 102 to fabricate a faulty fuel dispensing flow rate that is lower than the actual fuel flow rate out of the nozzle of the fuel dispensing terminal 102.

The operational flow 200 may begin when a user starts a fuel dispensing operation 160. For example, the user parks their vehicle at a fuel dispensing terminal 102. The user may initiate a request 172, e.g., by presenting their card data to the fuel dispensing terminal 102. The user may be verified by the local controller 140, fuel dispensing terminal 102, and/or the remote controller 180, similar to that described in FIG. 1A. The local controller 140 may detect that a fuel dispensing operation 160 is started. For example, when the user is verified, they may start operating the fuel dispensing terminal 102. In response, fuel starts to flow from the nozzle of the fuel dispensing terminal 102. This fuel flow rate is communicated from the fuel dispensing terminal 102 to the local controller 140. This indicates that the fuel dispensing operation 160 has begun.

Determining the Measured Volume Per Unit Time Parameter

The local controller 140 is configured to determine the measured fuel volume per unit time parameter 150. In certain embodiments, in order to determine the measured fuel volume per unit time parameter 150, the local controller 140 may perform certain measurements and calculations within a threshold wait period 154. The threshold wait period 154 may be configurable, e.g., by an operator. The threshold wait period 154 may be ten minutes, eight minutes, nine minutes, or any other suitable period.

In response to detecting the fuel dispensing operation 160, the local controller 140 may perform the following operations at each predetermined interval 196 from among a plurality of predetermined intervals 196 within the threshold wait period 154. The predetermined interval 196 may be five seconds, ten seconds, or any other suitable interval.

The local controller 140 may determine a volume of fuel 156 dispensed from the fuel dispensing terminal 102. By the end of the threshold wait period 154, the local controller 140 has determined an aggregate value for the volume of fuel pumped (i.e., dispensed) from the fuel dispensing terminal 102. This aggregate value of the dispensed fuel 156 may be fabricated and manipulated as a result of manipulating the pulser rod 120 of the fuel dispensing terminal 102 by a bad actor, similar to that described in FIG. 1A. In other words, this aggregate value of dispensed fuel 156 may be faulty (i.e., manipulated) and not representative of an expected amount of fuel pumped for the duration of the threshold wait period 154 if a bad actor has manipulated the pulser rod component 120 to turn more slowly. The local controller 140 may determine the measured volume per unit time parameter 150 associated with fuel dispensed from the fuel dispensing terminal 102 by dividing the identifier value 194 associated with the determined volume of fuel 156 by a unit parameter 192.

In certain embodiments, the local controller 140 may wait for a particular time period (e.g., ten seconds, fifteen seconds, or any other suitable period) from when fuel starts to flow to determine the volume of fuel 156 per interval 196 and the measured volume per unit time parameter 150. This is because, in some cases, when the fuel starts to flow out of the fuel dispensing terminal 102, the fuel flow rate may go through a transition state and take some time to reach a steady state of flow rate. Waiting for a particular time period before performing the operations described above may improve the accuracy of the measured volume per unit time parameter 150.

In certain embodiments, the operations for determining the measured volume per unit time parameter 150 described herein may be performed by the remote controller 180. The remote controller 180 may be configured to determine the measured fuel volume per unit time parameter 150. When the fuel dispensing operation 160 begins, the fuel dispensing terminal 102 and/or the local controller 140 may communicate a message indicating that the fuel dispensing operation 160 has started to the remote controller 180. The fuel dispensing terminal 102 and/or the local controller 140 may communicate the volume of fuel 156 dispensed per interval 196 to the remote controller 180. The remote controller 180 may perform certain measurements and calculations within a threshold wait period 154, similar to that described above to determine the measured volume per unit time parameter 150. In certain embodiments, the remote controller 180 may wait for a particular time period (e.g., ten seconds, fifteen seconds, or any other suitable period) from when fuel starts to flow to determine the volume of fuel 156 per interval 196 and the measured volume per unit time parameter 150.

In certain embodiments, the operations for determining the measured volume per unit time parameter 150 described herein may be performed by the fuel dispensing terminal 102. The fuel dispensing terminal 102 may be configured to determine the measured fuel volume per unit time parameter 150. When the fuel dispensing operation 160 begins, the fuel dispensing terminal 102 may determine a volume of fuel 156 dispensed per interval 196, e.g., via one or more sensors. The fuel dispensing terminal 102 may perform certain measurements and calculations within a threshold wait period 154, similar to that described above to determine the measured volume per unit time parameter 150. In certain embodiments, the fuel dispensing terminal 102 may wait for a particular time period (e.g., ten seconds, fifteen seconds, or any other suitable period) from when fuel starts to flow to determine the volume of fuel 156 per interval 196 and the measured volume per unit time parameter 150.

Determining Whether the Fuel Dispensing Operation is Malicious

The local controller 140 may determine whether the fuel dispensing operation 160 is malicious. To determine whether the fuel dispensing operation 160 is malicious (i.e., the determined volume of fuel 156 is manipulated), the local controller 140 may compare the measured fuel volume per unit time parameter 150 with the threshold volume per unit time parameter 152.

The threshold volume per unit time parameter 152 may be determined based on historical fuel dispensing operations at the fuel dispensing terminal 102 when it is known that the pulser rod 120, the meter component 122, and other components of the fuel dispensing terminal 102 are operating as expected, i.e., the fuel dispensing terminal 102 is not manipulated by a bad actor to turn the pulser rod 120 to rotate slower than the known speed. For example, the threshold volume per unit time parameter 152 may be determined under safe and monitored conditions when the fuel dispensing terminal 102 is not manipulated. If the local controller 140 determines that the measured volume per unit time parameter 150 is less than the threshold volume per unit time parameter 152, the local controller 140 may determine that the fuel dispensing operation 160 is malicious (or anomalous) and the fuel dispensing terminal 102 is manipulated by a bad actor. For example, this may be a result of the bad actor installing a malicious device inside the housing of the fuel dispensing terminal 102 to manipulate the pulser rod 120 to turn slower than the known speed which causes the metered fuel flow rate calculated by a meter of the fuel dispensing terminal 102 to be less than the expected fuel flow rate for the duration of the threshold wait period 154.

In response to determining that the measured volume per unit time parameter 150 is less than the threshold volume per unit time parameter 152, the local controller 140 may determine that the fuel dispensing operation 160 is associated with an anomaly that indicates that the measured fuel volume per unit time parameter 150 is less than the threshold fuel volume per unit time parameter 152. In another example, the anomaly may indicate unauthorized access to fuel.

In certain embodiments, in response to determining that the measured volume per unit time parameter 150 is less than the threshold volume per unit time parameter 152, the local controller 140 may communicate an alert message that indicates the fuel dispensing operation 160 is associated with the anomaly and is malicious. For example, the local controller 140 may communicate the alert message to a computing device at the gas station 104, the remote controller 180, and/or a third party 190 (e.g., law enforcement), among others. For example, an operator at the gas station 104 may receive the alert message and come to the fuel dispensing terminal 102 to investigate.

If the local controller 140 determines that the measured volume per unit time parameter 150 is more than (or equal to) the threshold volume per unit time parameter 152, the local controller 140 may determine that the fuel dispensing operation 160 is not malicious and is not anomalous.

The corresponding description below describes a particular example of determining the measured volume per unit time parameter 150. In certain embodiments, the volume of fuel 156 may be measured in gallons, the measured volume per unit time parameter 150 may be the actual gallon per minute measurement, the threshold volume per unit time parameter 152 may be measured in gallon per minute, the unit parameter 192 may be fuel cost per gallon, and the identifier value 194 may represent fuel cost for the dispensed fuel amount. An example of a plurality of identifier values 194 associated with amount of fuel 156 pumped per interval 196 is shown in Table 1.

TABLE 1

Example identifier values 194 associated with the amount of fuel 156 dispensed.

| Interval 196 | Identifier value 194 associated with fuel amount 156 dispensed |
|---|---|
| 1 | 0.059 |
| 2 | 0.204 |
| 3 | 0.249 |
| 4 | 0.358 |
| 5 | 0.502 |
| 6 | 0.568 |
| 7 | 0.668 |
| 8 | 0.801 |
| 9 | 0.946 |
| 10 | 0.983 |
| 11 | 1.09 |

The numbers in Table 1 are exemplary and are not meant to limit the scope of the present disposure. Only rows 1-11 are shown in Table 1 for illustration purposes. As can be seen from the example Table 1, the aggregate identifier value 194 by end of the threshold wait period 154 is 1.09. The measured volume per unit time parameter 150 may be determined by the equation (1).

$$X = \frac{\partial}{\theta} \quad \text{Eq (1)}$$

Where X is the measured volume per unit time parameter 150, θ is the identifier value 194, and θ is the unit parameter 192.

In this particular example, assume that fuel cost per gallon is 1.299, the interval 196 is five seconds, and the threshold gallon per minute is 1.0. In this particular example, X can be calculated as $$\frac{1.09}{1.299} = 0.839$$

gallon per minute. Since this example shows that actual gallon per minute (i.e., X) is less than the threshold gallon per minute (e.g., 1.0), the local controller 140 determines that the fuel dispensing operation 160 is anomalous or malicious. If the threshold wait period 154 is more than a minute, the actual gallon per minute is divided by a number of minutes in the threshold wait period 154 to determine the actual gallon per minute dispensed.

In certain embodiments, the operations for determining whether the fuel dispensing operation 160 is malicious described herein may be performed by the remote controller 180. For example, the remote controller 180 may compare the measured fuel volume per unit time parameter 150 with the threshold volume per unit time parameter 152. If the remote controller 180 determines that the measured volume per unit time parameter 150 is less than the threshold volume per unit time parameter 152, the remote controller 180 may determine that the fuel dispensing operation 160 is malicious (or anomalous) and the fuel dispensing terminal 102 is manipulated by a bad actor. Otherwise, the remote controller 180 may determine that the fuel dispensing operation 160 is not malicious and is not anomalous.

In certain embodiments, in response to determining that the measured volume per unit time parameter 150 is less than the threshold volume per unit time parameter 152, the remote controller 180 may communicate an alert message that indicates the fuel dispensing operation 160 is associated with the anomaly and is malicious. For example, the remote controller 180 may communicate the alert message to a computing device at the gas station 104, the local controller 140, and/or a third party 190 (e.g., law enforcement), among others.

In certain embodiments, the operations for determining whether the fuel dispensing operation 160 is malicious described herein may be performed by the fuel dispensing terminal 102. For example, the fuel dispensing terminal 102 may compare the measured fuel volume per unit time parameter 150 with the threshold volume per unit time parameter 152. If the fuel dispensing terminal 102 determines that the measured volume per unit time parameter 150 is less than the threshold volume per unit time parameter 152, the fuel dispensing terminal 102 may determine that the fuel dispensing operation 160 is malicious (or anomalous) and the fuel dispensing terminal 102 is manipulated by a bad actor. Otherwise, the fuel dispensing terminal 102 may determine that the fuel dispensing operation 160 is not malicious and is not anomalous.

In certain embodiments, in response to determining that the measured volume per unit time parameter 150 is less than the threshold volume per unit time parameter 152, the fuel dispensing terminal 102 may communicate an alert message that indicates the fuel dispensing operation 160 is associated with the anomaly and is malicious. For example, the fuel dispensing terminal 102 may communicate the alert message to a computing device at the gas station 104, the local controller 140, the remote controller 180, and/or a third party 190 (e.g., law enforcement), among others.

Instructing the Fuel Dispensing Terminal to Stop Dispensing Fuel

If the local controller 140 determines that the measured volume per unit time parameter 150 is less than the threshold volume per unit time parameter 152, the local controller 140 may communicate an electronic signal 158 to the fuel dispensing terminal 102 that instructs the fuel dispensing terminal 102 to stop dispensing fuel. This operation may be performed during the malicious fuel dispensing operation 160. Therefore, in this way, the local controller 140 is configured to reduce, minimize (or prevent) unauthorized access to fuel while the malicious fuel dispensing operation 160 is ongoing.

In certain embodiments, the electronic signal 158 may cause the fuel dispensing terminal 102 to turn off. For example, the electronic signal 158 may include fuel termination instructions that when executed by the processor 112 (see FIG. 1A) shuts down one or more relevant components (see FIG. 1A) of the fuel dispensing terminal 102 such that the fuel dispensing terminal 102 stops dispensing fuel. In such embodiments, the fuel dispensing terminal 102 may be investigated by a technician, the malicious device may be removed from inside the fuel dispensing terminal 102 (if it is still remained inside the fuel dispensing terminal 102 by the bad actor), and the fuel dispensing terminal 102 is repaired (if needed).

In certain embodiments, the electronic signal 158 may cause one or more valves that are used to control the flow of the fuel coming out of the nozzle of the fuel dispensing terminal 102 to close. In this way, the fuel pump is stopped. In such embodiments, after terminating and stopping the malicious fuel dispensing operation 160 and the bad actor is discouraged to perform another malicious fuel dispensing, when a subsequent user approaches and attempts to perform a legitimate fuel dispensing operation 160, the fuel dispensing terminal 102 may operate as expected.

In certain embodiments, the electronic signal 158 may include instructions that cause the fuel dispensing terminal 102 to go out of service for future operations. For example, the fuel dispensing terminal 102 may go out of service until further notice after revision or until investigated and/or serviced by a technician. In the same or another example, an existing code may be triggered that puts the fuel dispensing terminal 102 out of service unit a technician comes onsite and enters a code indicating, for example, that the fuel dispensing terminal 102 has been serviced.

In certain embodiments, the operations for instructing the fuel dispensing terminal 102 to stop dispensing fuel described herein may be performed by the remote controller 180. If the remote controller 180 determines that the measured volume per unit time parameter 150 is less than the threshold volume per unit time parameter 152, the remote controller 180 may communicate an electronic signal 158 to the fuel dispensing terminal 102 that instructs the fuel dispensing terminal 102 to stop dispensing fuel. This operation may be performed during the malicious fuel dispensing operation 160. Therefore, in this way, the remote controller 180 is configured to reduce, minimize (or prevent) unauthorized access to fuel while the malicious fuel dispensing operation 160 is ongoing.

In certain embodiments, the operations for instructing the fuel dispensing terminal 102 to stop dispensing fuel described herein may be performed by the fuel dispensing terminal 102 itself. In other words, the fuel dispensing terminal 102 may be configured to execute the software instructions 118 that when executed by the processor 112, cause the processor 112 to trigger or implement the electronic signal 158 that instructs the fuel dispensing system 110 to stop dispensing fuel. For example, if the fuel dispensing terminal 102 determines that the measured volume per unit time parameter 150 is less than the threshold volume per unit time parameter 152, the processor 112 may communicate the electronic signal 158 to the fuel dispensing system 110 that instructs the fuel dispensing system 110 to stop dispensing fuel. This operation may be performed during the malicious fuel dispensing operation 160. Therefore, in this way, the fuel dispensing terminal 102 is configured to reduce, minimize (or prevent) unauthorized access to fuel while the malicious fuel dispensing operation 160 is ongoing.

Generating a File for Investigating the Malicious Fuel Dispensing Operation

The local controller 140 may be configured to generate a file 170 and include information in the file 170 that can be used for investigating the malicious fuel dispensing operations 160.

In certain embodiments, in response to determining that the measured volume per unit time parameter 150 is less than the threshold volume per unit time parameter 152, the local controller 140 may retrieve a video feed 162 that shows the fuel dispensing terminal 102 during the malicious fuel dispensing operation 160. In this process, the local controller 140 may determine a timestamp window 164 associated with the malicious or anomalous fuel dispensing operation 160. The timestamp window 164 indicates the start and stop time of the fuel dispensing operation 160. The local controller 140 may retrieve the video feed 162 that shows the fuel dispensing terminal 102 during the timestamp window 164. The local controller 140 may retrieve the video feed 162 from the camera 106 which is facing a space where the fuel dispensing terminal 102 is located. For example, the video feed 162 may be communicated from the camera 106 to the local controller 140 in response to the local controller 140 sending a retrieve request to the camera 106. In another example, the camera 106 may communicate the video feed 162 in real-time, periodically, or on demand to the local controller 140.

The local controller 140 may generate a file 170 and store it in the memory 146. The file 170 may be associated with the fuel dispensing operation 160. The local controller 140 stores the video feed 162 in the generated file 170.

The local controller 140 may include any other suitable information in the file 170. For example, local controller 140 may retrieve the user information 166 associated with the fuel dispensing operation 160. The local controller 140 may determine the user information 166 from the request 172, similar to that described above in FIG. 1A. The user information 166 may be retrieved from a data card (presented by the user) used in conjunction with initiating the fuel dispensing operation 160 and verifying the identity of the user. The local controller 140 may store the user information 166 in the generated file 170.

In another example, the local controller 140 may include vehicle information 168 in the file 170. The vehicle information 168 may include a type, a model number, a model name, and a plate number associated with the vehicle involved in the fuel dispensing operation 160.

For example, the local controller 140 may feed the video feed 162 to a machine learning algorithm 195 that is configured to identify the vehicle information 168 from the video feed 162. The machine learning algorithm 195 may be implemented by the processor 142 executing the software instructions 148. The machine learning algorithm 195 may include image processing, text processing, object recognition, among others. The machine learning algorithm 195 may be implemented by a plurality of neural network layers, convolutional neural network layers, Long-Short-Term-Memory (LSTM) layers, Bi-directional LSTM layers, recurrent neural network layers, and the like.

The local controller 140 may store the vehicle information 168 in the generated file 170. In certain embodiments, the local controller 140 may also include the measured volume per unit time parameter 150, threshold volume per unit time parameter 152, and any other data/information in the file 170. The local controller 140 may transmit the file 170 to a third party 190 (e.g., authorities, law enforcement, among others) to be used for investigating the user, the vehicle, and the fuel dispensing operation 160.

In certain embodiments, the operations for generating the file 170 described herein may be performed by the remote controller 180. For example, in response to determining that the measured volume per unit time parameter 150 is less than the threshold volume per unit time parameter 152, the remote controller 180 may retrieve the video feed 162, determine user information 166 and vehicle information 168, similar to that described above with respect to the local controller 140. The remote controller 180 may include the video feed 162, the user information 166, and the vehicle information 168, and/or any other data associated with the fuel dispensing operation 160 in the file 170. The remote controller 180 may transmit the file 170 to a third party 190 to be used for investigating the user, the vehicle, and the fuel dispensing operation 160.

In certain embodiments, the operations for generating the file 170 described herein may be performed by the fuel dispensing terminal 102. For example, in response to determining that the measured volume per unit time parameter 150 is less than the threshold volume per unit time parameter 152, the fuel dispensing terminal 102 may retrieve the video feed 162, determine user information 166, and vehicle information 168, similar to that described above with respect to the local controller 140. The fuel dispensing terminal 102 may include the video feed 162, the user information 166, and the vehicle information 168, and/or any other data associated with the fuel dispensing operation 160 in the file 170. The fuel dispensing terminal 102 may transmit the file 170 to a third party 190 to be used for investigating the user, the vehicle, and the fuel dispensing operation 160.

Detecting a Subsequent Malicious Fuel Dispensing Operation

The local controller 140 may perform further operations that may escalate the situation when a subsequent anomalous fuel dispensing operation 160 is detected within a certain threshold period after the first or initial anomalous fuel dispensing operation 160. For example, when the fuel pump is stopped after determining that the first fuel dispensing operation 160 is malicious or anomalous, (similar to that described above), the bad actor may try again and attempt to request a second fuel dispensing operation 160.

The local controller 140 may perform the operations described above with respect to the first fuel dispensing operation 160 to determine whether the second fuel dispensing operation 160 is malicious or anomalous. For example, assume that the local controller 140 detects a second fuel dispensing operation 160 that indicates fuel is being dispensed from the fuel dispensing terminal 102, where the second fuel dispensing operation 160 is detected within a certain threshold period (e.g., within one minute, two minutes, ten minutes, twelve minutes, etc.) after the first fuel dispensing operation 160 was detected.

If the local controller 140 determines that the second fuel dispensing operation 160 is also malicious or anomalous (i.e., a second measured volume per unit time parameter 150 is less than the threshold volume per unit time parameter 152), the local controller 140 may communicate a second electronic signal 158 to the fuel dispensing terminal 102 that instructs the fuel dispensing terminal 102 to stop dispensing fuel. The local controller 140 may also communicate an alert message that indicates the first and second fuel dispensing operations 160 are malicious and/or anomalous. For example, the local controller 140 may communicate the alert message to the remote controller 180, the third party 190, and/or any other entity. For example, in response to receiving the alert message, law enforcement may arrive at the fuel dispensing terminal 102 and question the user regarding the malicious fuel dispensing operations 160.

In certain embodiments, the operations for detecting a subsequent malicious fuel dispensing operation 160 described herein may be performed by the remote controller 180. The remote controller 180 may be configured to perform further operations that may escalate the situation when a subsequent anomalous fuel dispensing operation 160 is detected within a certain threshold period after the first or initial anomalous fuel dispensing operation 160.

The remote controller 180 may perform the operations described above with respect to the first fuel dispensing operation 160 to determine whether the second fuel dispensing operation 160 is malicious or anomalous. Assume that the remote controller 180 detects a second fuel dispensing operation 160 that indicates fuel is being dispensed from the fuel dispensing terminal 102, where the second fuel dispensing operation 160 is detected within a certain threshold period (e.g., within one minute, two minutes, ten minutes, twelve minutes, etc.) after the first fuel dispensing operation 160 was detected.

If the remote controller 180 determines that the second fuel dispensing operation 160 is also malicious or anomalous (i.e., a second measured volume per unit time parameter 150 is less than the threshold volume per unit time parameter 152), the remote controller 180 may communicate a second electronic signal 158 to the fuel dispensing terminal 102 that instructs the fuel dispensing terminal 102 to stop dispensing fuel. The remote controller 180 may also communicate an alert message that indicates the first and second fuel dispensing operations 160 are malicious and/or anomalous. For example, the remote controller 180 may communicate the alert message to the local controller 140, the third party 190, and/or any other entity. For example, in response to receiving the alert message, law enforcement may arrive at the fuel dispensing terminal 102 and question the user regarding the malicious fuel dispensing operations 160.

In certain embodiments, the operations for detecting a subsequent malicious fuel dispensing operation 160 described herein may be performed by the fuel dispensing terminal 102. The fuel dispensing terminal 102 may be configured to perform further operations that may escalate the situation when a subsequent anomalous fuel dispensing operation 160 is detected within a certain threshold period after the first or initial anomalous fuel dispensing operation 160.

The fuel dispensing terminal 102 may perform the operations described above with respect to the first fuel dispensing operation 160 to determine whether the second fuel dispensing operation 160 is malicious or anomalous. Assume that the fuel dispensing terminal 102 detects a second fuel dispensing operation 160 that indicates fuel is being dispensed from the fuel dispensing terminal 102, where the second fuel dispensing operation 160 is detected within a certain threshold period (e.g., within one minute, two minutes, ten minutes, twelve minutes, etc.) after the first fuel dispensing operation 160 was detected.

If the fuel dispensing terminal 102 determines that the second fuel dispensing operation 160 is also malicious or anomalous (i.e., a second measured volume per unit time parameter 150 is less than the threshold volume per unit time parameter 152), the fuel dispensing terminal 102 may implement a second electronic signal 158 that instructs the fuel dispensing system 110 to stop dispensing fuel. The fuel dispensing terminal 102 may also communicate an alert message that indicates the first and second fuel dispensing operations 160 are malicious and/or anomalous. For example, the fuel dispensing terminal 102 may communicate the alert message to the local controller 140, the remote controller 180, the third party 190, and/or any other entity. For example, in response to receiving the alert message, law enforcement may arrive at the fuel dispensing terminal 102 and question the user regarding the malicious fuel dispensing operations 160.

Reducing False Positive Detections of Malicious Fuel Dispensing Operations

The local controller 140 may be configured to reduce false positive detections of malicious (i.e., anomalous) fuel dispensing operations 160. In certain embodiments, the local controller 140 may use an average fuel volume per unit time parameter 176 from previous (e.g., recent) fuel dispending operations 160.

The local controller 140 may determine a plurality of measured fuel volume per unit time parameters 150 from a plurality of previous fuel dispensing operations 160 (e.g., previous five fuel dispensing operations 160, previous ten fuel dispensing operations 160, etc.). The plurality of measured fuel volume per unit time parameters 150 may be stored in the event logs 178.

The local controller 140 may determine the average fuel volume per unit time parameter 176 by averaging the plurality of measured fuel volume per unit time parameters 150. The local controller 140 may compare the average volume per unit time parameter 176 with the measured volume per unit time parameter 150.

If the local controller 140 determines that the average volume per unit time parameter 176 exceeds the measured volume per unit time parameter 150 by a threshold value (e.g., one-third, one, two, five, ten, or any other suitable value), the local controller 140 may determine that the fuel dispensing operation 160 is associated with the anomaly and is malicious. In other words, if the local controller 140 determines that the measured volume per unit time parameter 150 has significantly dropped compared to the average volume per unit time parameter 176, it determines that the fuel dispensing operation 160 is anomalous and/or malicious. In this way, the local controller 140 may use the average volume per unit time parameter 176 as additional information to verify and evaluate the fuel dispensing operation 160. This improves the accuracy of the anomaly detection process for the fuel dispensing operations 160.

In certain embodiments, the local controller 140 may change the duration for the threshold wait period 154 and determine whether the determined measured volume per unit time parameter 150 at the end of various threshold wait periods 154 is more than or less than the threshold volume per unit time parameter 152. In this way, a more comprehensive and accurate result of evaluating the determined measured volume per unit time parameter 150 may be obtained.

In certain embodiments, the local controller 140 may be configured to not to stop the fuel flow until two or more slow fuel flow rates (e.g., flow rates less than threshold volume per unit time parameter 152) within X minutes have taken place, where X may be one, two, three, etc.

In certain embodiments, after detecting a first slow fuel flow rate and stopping the fuel flow, an alert message may be displayed on the user interface 108 (see FIG. 1A) of the fuel dispensing terminal 102. The alert message may indicate that the fuel flow rate is unexpectedly low. After seeing the alert message, a legitimate user may inform an operator at gas station 104 (see FIG. 1A) and/or use another fuel dispensing terminal 102. A bad actor, after seeing the alert message, may continue another malicious fuel dispensing operation 160. Therefore, if multiple slow fuel flow rates are detected within X minutes, it may further confirm that the fuel dispensing operations 160 are anomalous and it is not just a faulty fuel dispensing terminal 102 in need of routine repair.

The operational flow 200 is described to be performed by the local controller 140. However, one of ordinary skill in the art would appreciate other embodiments in light of the present disclosure. For example, the operational flow 200 may be performed by the fuel dispensing terminal 102 performing some or all of the fuel dispensing operation 160. In this example, the fuel dispensing terminal 102 may determine the measured volume per unit time parameter 150, compare it with the threshold volume per unit time parameter 152, determine whether the fuel dispensing operation 160 is anomalous or not, stop the fuel dispensing if the fuel dispensing operation 160 is anomalous, retrieve video feed 162, create the file 170, include video feed 162, user information 166, vehicle information 168 in the file 170, and communicate it to the third party 190.

In another example, the operational flow 200 may be performed by the remote controller 180. In this example, the remote controller 180 may determine the measured volume per unit time parameter 150, compare it with the threshold volume per unit time parameter 152, determine whether the fuel dispensing operation 160 is anomalous or not, stop the fuel dispensing if the fuel dispensing operation 160 is anomalous, retrieve video feed 162, create the file 170, include video feed 162, user information 166, vehicle information 168 in the file 170, and communicate it to the third party 190.

In certain embodiments, the anomaly detection process (i.e., detecting malicious fuel dispensing operations 160) may be performed by the remote controller 180 from data transferred from the fuel dispensing terminal 102 and/or the local controller 140, where the data includes, but not limited to, the volume of fuel 156 per interval 196.

In certain embodiments, the issuance of an electronic signal stopping the fuel flow (e.g., in the electronic signal 158) to the fuel dispensing terminal 102 may be from the local controller 140. In certain embodiments, the issuing of an electronic signal stopping the fuel flow (e.g., in the electronic signal 158) to the fuel dispensing terminal 102 may be from the remote controller 180 to the local controller 140, and then from the local controller 140 to the fuel dispensing terminal 102. In certain embodiments, the issuing of an electronic signal stopping the fuel flow (e.g., in the electronic signal 158) to the fuel dispensing terminal 102 may be from the remote controller 180 to the fuel dispensing terminal 102. In certain embodiments, the issuing of an electronic signal stopping the fuel flow (e.g., in the electronic signal 158) to the fuel dispensing terminal 102 may be from a computing device at the gas station 104 (see FIG. 1A) to the fuel dispensing terminal 102. In certain embodiments, the issuing of an electronic signal stopping the fuel flow (e.g., in the electronic signal 158) may be implemented by the processor 112 resident inside the fuel dispensing terminal 102.

In certain embodiments, the operations for reducing false positive detections of malicious fuel dispensing operations 160 described herein may be performed by the remote controller 180. For example, the remote controller 180 may determine the average fuel volume per unit time parameter 150 from a plurality of previous fuel dispensing operations 160.

The remote controller 180 may compare the average volume per unit time parameter 176 with the measured volume per unit time parameter 150. If the remote controller 180 determines that the average volume per unit time parameter 176 exceeds the measured volume per unit time parameter 150 by a threshold value (e.g., one-third, one, two, five, ten, or any other suitable value), the remote controller 180 may determine that the fuel dispensing operation 160 is associated with the anomaly and is malicious.

In certain embodiments, the remote controller 180 may change the duration for the threshold wait period 154 and determine whether the determined measured volume per unit time parameter 150 at the end of various threshold wait periods 154 is more than or less than the threshold volume per unit time parameter 152.

In certain embodiments, the remote controller 180 may be configured to not to stop the fuel flow until two or more slow fuel flow rates (e.g., flow rates less than threshold volume per unit time parameter 152) within X minutes have taken place, where X may be one, two, three, etc.

In certain embodiments, the operations for reducing false positive detections of malicious fuel dispensing operations 160 described herein may be performed by the fuel dispensing terminal 102. For example, the fuel dispensing terminal 102 may determine the average fuel volume per unit time parameter 150 from a plurality of previous fuel dispensing operations 160.

The fuel dispensing terminal 102 may compare the average volume per unit time parameter 176 with the measured volume per unit time parameter 150. If the fuel dispensing terminal 102 determines that the average volume per unit time parameter 176 exceeds the measured volume per unit time parameter 150 by a threshold value (e.g., one-third, one, two, five, ten, or any other suitable value), the fuel dispensing terminal 102 may determine that the fuel dispensing operation 160 is associated with the anomaly and is malicious.

In certain embodiments, the fuel dispensing terminal 102 may change the duration for the threshold wait period 154 and determine whether the determined measured volume per unit time parameter 150 at the end of various threshold wait periods 154 is more than or less than the threshold volume per unit time parameter 152.

In certain embodiments, the fuel dispensing terminal 102 may be configured to not to stop the fuel flow until two or more slow fuel flow rates (e.g., flow rates less than threshold volume per unit time parameter 152) within X minutes have taken place, where X may be one, two, three, etc.

In certain embodiments, the fuel dispensing terminals 102 may form a mesh network of devices that are in communication with one another, e.g., via network 111 (see FIG. 1A). For example, a bad actor may attempt to perform a first malicious fuel dispensing operation 160 at a first fuel dispensing terminal 102, the first fuel dispensing terminal 102, local controller 140, and/or the remote controller 180 may detect the first malicious fuel dispensing operation 160 and communicate a first electronic signal 158 to the first fuel dispensing terminal 102 that instructs the first fuel dispensing terminal 102 to stop dispensing fuel. In some cases, the bad actor may try a second fuel dispensing terminal 102. The second fuel dispensing terminal 102, local controller 140, and/or the remote controller 180 determine that the same user associated with the first malicious fuel dispensing operation 160 is attempting to perform a second fuel dispensing operation 160 at the second fuel dispensing terminal 102 based on the user information 166, vehicle information 168, and/or other data associated with the user and vehicle. If the second fuel dispensing terminal 102, local controller 140, and/or the remote controller 180 determine that the second fuel dispensing operation 160 is also anomalous, a second electronic signal 158 may be implemented that instructs the second fuel dispensing terminal 102 to stop dispensing fuel. The second fuel dispensing terminal 102, local controller 140, and/or the remote controller 180 may communicate an alert message to a third party regarding the malicious fuel dispensing operations 160 by the user.

Figure 3:
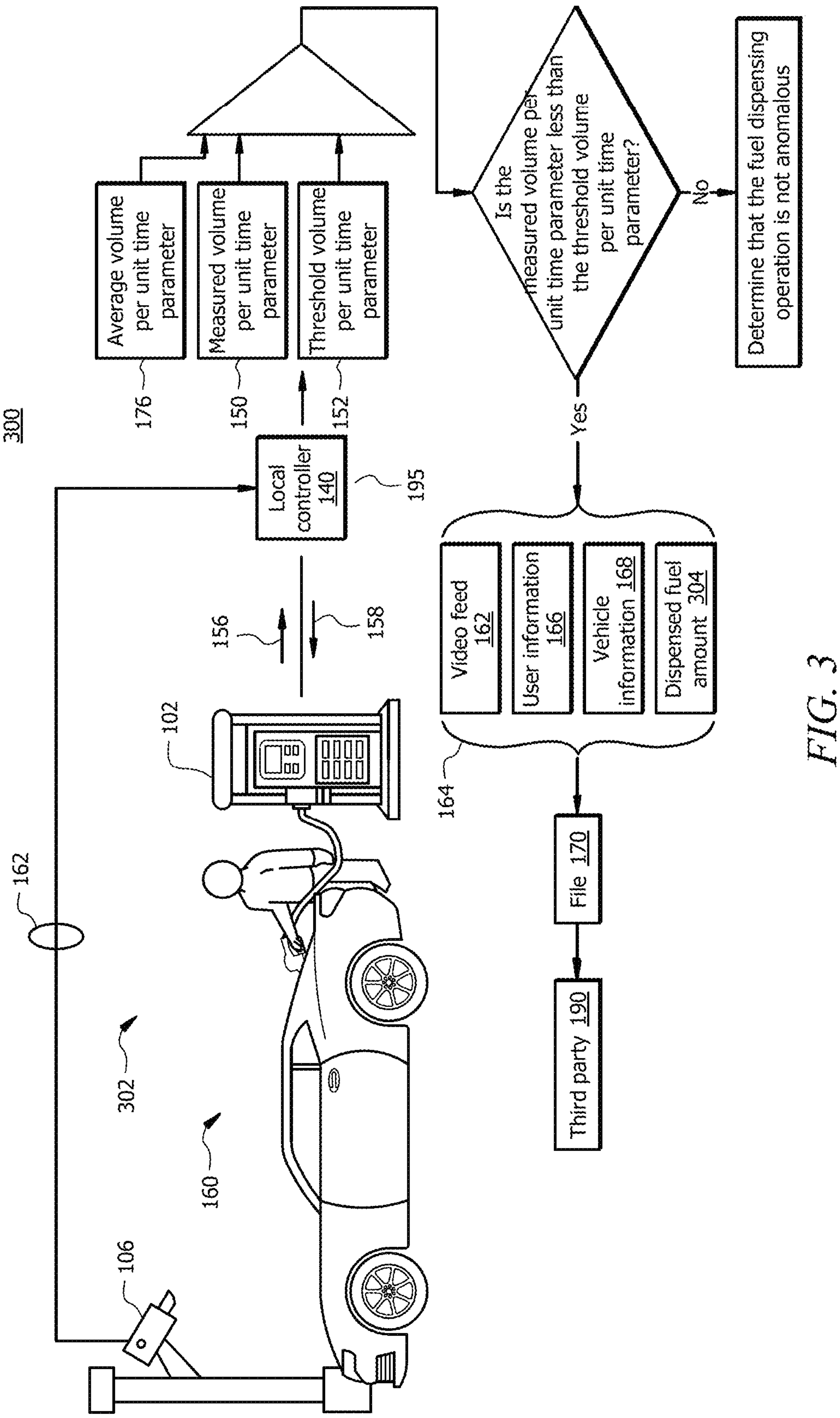
FIG. 3 illustrates an example operational flow of the system of FIG. 1A to implement anomaly detection at a fuel dispensing terminal after a fuel dispensing operation is completed.

Example Operational Flow for Anomaly Detection after a Fuel Dispensing Operation FIG. 3 illustrates an example operational flow 300 of system 100 of FIG. 1A for anomaly detection after a fuel dispensing operations 160 at the fuel dispensing terminals 102, where the anomaly may indicate a malicious attempt to manipulate components (e.g., pulser rod 120) of the fuel dispensing terminal 102 to fabricate a faulty fuel dispensing flow rate that is lower than the actual fuel flow rate out of the nozzle of the fuel dispensing terminal 102.

In certain embodiments, in gas stations 104 where the operational flow 200 described in FIG. 2 is not deployed to detect anomalous fuel dispensing operations 160, the operational flow 300 may be implemented to detect anomalous fuel dispensing operations 160 after completion. Results of the operational flow 300 across multiple gas stations 104 within a network of gas stations 104 may be evaluated. In this way, marked gas stations 104 that are often used by bad actors to commit malicious fuel dispensing operations 160 are detected. Therefore, system 100 (see FIG. 1A) provides valuable information for allocating computer resources and deploying the operational flow 200 in the marked gas stations 104. In this way, the security, efficiency, and quality of operations at those gas stations 104 are improved.

The operational flow 300 may begin when a user performs a fuel dispensing operation 160 after being authorized by the components of the system 100, similar to that described above in FIG. 2. The fuel dispensing terminal 102 communicates the amount of fuel 156 at intervals 196 to the local controller 140.

The local controller 140 determines a duration of an interaction period 302 during which the user performed the fuel dispensing operation 160. The interaction period 302 is the duration that the fuel dispensing operation 160 is performed at the fuel dispensing terminal 102. To determine the interaction period 302, the local controller 140 determines a start time when the fuel starts to flow from the fuel dispensing terminal 102, a stop time when the fuel flow stops, and determine a difference between the start time and the stop time.

The local controller 140 determines a volume of fuel 156 dispensed from the fuel dispensing terminal 102 during the interaction period 302. The volume of fuel 156 dispensed from the fuel dispensing terminal 102 may correspond to the total amount of fuel flow out of the fuel dispensing terminal 102.

The local controller 140 may determine a measured volume per unit time parameter 150 associated with fuel dispensed from the fuel dispensing terminal 102 by dividing the determined volume of fuel 156 (for the duration of the interaction period 302) by the interaction period 302. To convert the determined measured volume per unit time parameter 150 to fuel volume per minute, the local controller 140 may divide the determined measured volume per unit time parameter 150 by sixty, assuming that the interaction period 302 is in seconds.

The local controller 140 compares the measured volume per unit parameter 150 with the threshold volume per unit time parameter 152. If the local controller 140 determines that the measured volume per unit time parameter 150 is more than the threshold volume per unit time parameter 152, the local controller 140 determines that the fuel dispensing operation 160 is not anomalous (i.e., is not malicious).

If the local controller 140 determines that the measured volume per unit time parameter 150 is less than the threshold volume per unit time parameter 152, the local controller 140 determines that the fuel dispensing operation 160 is anomalous (i.e., is malicious). In this case, the local controller 140 may perform the operations below. For example, the local controller 140 may fetch a video feed 162 that shows the fuel dispensing terminal 102 during the timestamp window 164 when the fuel dispensing operation 160 has occurred. To this end, the local controller 140 may determine the timestamp window 164 during which the fuel dispensing operation 160 occurred.

The local controller 140 retrieves a video feed 162 that shows the fuel dispensing terminal 102 during the timestamp window 164. The local controller 140 may retrieve the video feed 162 from the camera 106 which is facing a space where the fuel dispensing terminal 102 is located. For example, the video feed 162 may be communicated from the camera 106 to the local controller 140 in response to the local controller 140 sending a retrieve request to the camera 106. In another example, the camera 106 may communicate the video feed 162 in real-time, periodically, or on demand to the local controller 140.

The local controller 140 may create a file 170 for the fuel dispensing operation 160 and store it in the memory 146. The local controller 140 stores the video feed 162 in the generated file 170. The local controller 140 may include any other information in the file 170. For example, the local controller 140 may store user information 166 and vehicle information 168 in the file 170. The local controller 140 may retrieve and/or determine the user information 166 and the vehicle information 168, similar to that described in FIG. 2.

Determining the Actual Amount of Fuel Dispensed During a Malicious Fuel Dispensing Operation As described above, during the malicious fuel dispensing operation 160, a bad actor has manipulated the fuel dispensing terminal 102 to falsify or alter an amount of fuel dispensed from the fuel dispensing terminal 102 that is measured by the fuel dispensing terminal 102. The local controller 140 may determine the actual amount of fuel dispensed during malicious fuel dispensing operations as described below. The local controller 140 determines a first volume of fuel available at the fuel dispensing terminal 102 before the interaction period 302 starts. The first volume of fuel may represent the total available fuel amount at the gas station 104 before the interaction period 302 started. The local controller 140 determines a second volume of fuel available at the fuel dispensing terminal 102 after the interaction period 302 is completed. The second volume of fuel may represent the total available fuel available at the fuel dispensing terminal 102 after the interaction period 302 is completed. The local controller 140 may determine the amounts of fuel before and after the interaction period 302 by checking the fuel tank at the gas station 104 (see FIG. 1A). The local controller 140 determines a difference between the first volume of fuel and the second volume of fuel, where the difference between the first volume of fuel and the second volume of fuel indicates the actual fuel amount 304 dispensed during the fuel dispensing operation 160 at the fuel dispensing terminal 102.

The local controller 140 may store the dispensed amount of fuel during the anomalous fuel dispensing operation 160 in the file 170 associated with the fuel dispensing operation 160. The local controller 140 may transmit the file 170 to a third party 190 to be used for investigating the user, the vehicle, and the fuel dispensing operation 160.

In certain embodiments, the local controller 140 may use an average fuel volume per unit time parameter 176 from previous (e.g., recent) fuel dispending operations 160 as additional information in determining whether the fuel dispensing operation 160 is anomalous or not, similar to that described in FIG. 2.

In certain embodiments, the local controller 140 may wait for a particular time period (e.g., ten seconds, fifteen seconds, or any other suitable period) to determine the measured volume per unit time parameter 150, similar to that described in FIG. 2.

In certain embodiments, in response to determining that the measured volume per unit time parameter 150 is less than the threshold volume per unit time parameter 152, the local controller 140 may communicate an alert message that indicates the fuel dispensing operation 160 is associated with an anomaly that indicates a discrepancy between the measured volume per unit time parameter 150 and the threshold volume per unit time parameter 152. For example, the local controller 140 may communicate the alert message to a computing device at the gas station 104, the remote controller 180, and/or a third party 190.

In certain embodiments, in response to determining that the measured volume per unit time parameter 150 is less than the threshold volume per unit time parameter 152, the local controller 140 may communicate an electronic signal 158 to the fuel dispensing terminal 102. In one example, the electronic signal 158 may instruct the fuel dispensing terminal 102 to turn off. In this case, the electronic signal 158 may include instructions that cause the fuel dispensing terminal 102 to go out of service for future operations. For example, the fuel dispensing terminal 102 may go out of service until further notice after revision or until investigated and/or serviced by a technician. In the same or another example, an existing code may be triggered that puts the fuel dispensing terminal 102 out of service unit a technician comes onsite and enters a code indicating, for example, that the fuel dispensing terminal 102 has been serviced. In another example, the electronic signal 158 may instruct the fuel dispensing terminal 102 to close values of a fuel dispensing terminal 102 that control the fuel flow.

In certain embodiments, in response to determining that the measured volume per unit time parameter 150 is less than the threshold volume per unit time parameter 152, the remote controller 180 may communicate the electronic signal 158 to the fuel dispensing terminal 102.

In certain embodiments, in response to determining that the measured volume per unit time parameter 150 is less than the threshold volume per unit time parameter 152, the fuel dispensing terminal 102 may trigger the electronic signal 158. For example, the processor 112 may trigger the electronic signal 158. The electronic signal 158 may act as a kill switch or turn off signal that causes the fuel dispensing terminal 102 to go out of service, similar to that described above.

The operational flow 300 is described to be performed by the local controller 140. However, one of ordinary skill in the art would appreciate other embodiments in light of the present disclosure. For example, the operational flow 300 may be performed by the fuel dispensing terminal 102. In another example, the operational flow 300 may be performed by the remote controller 180.

Example Method for Anomaly Detection During a Fuel Dispensing Operation

Figure 4:
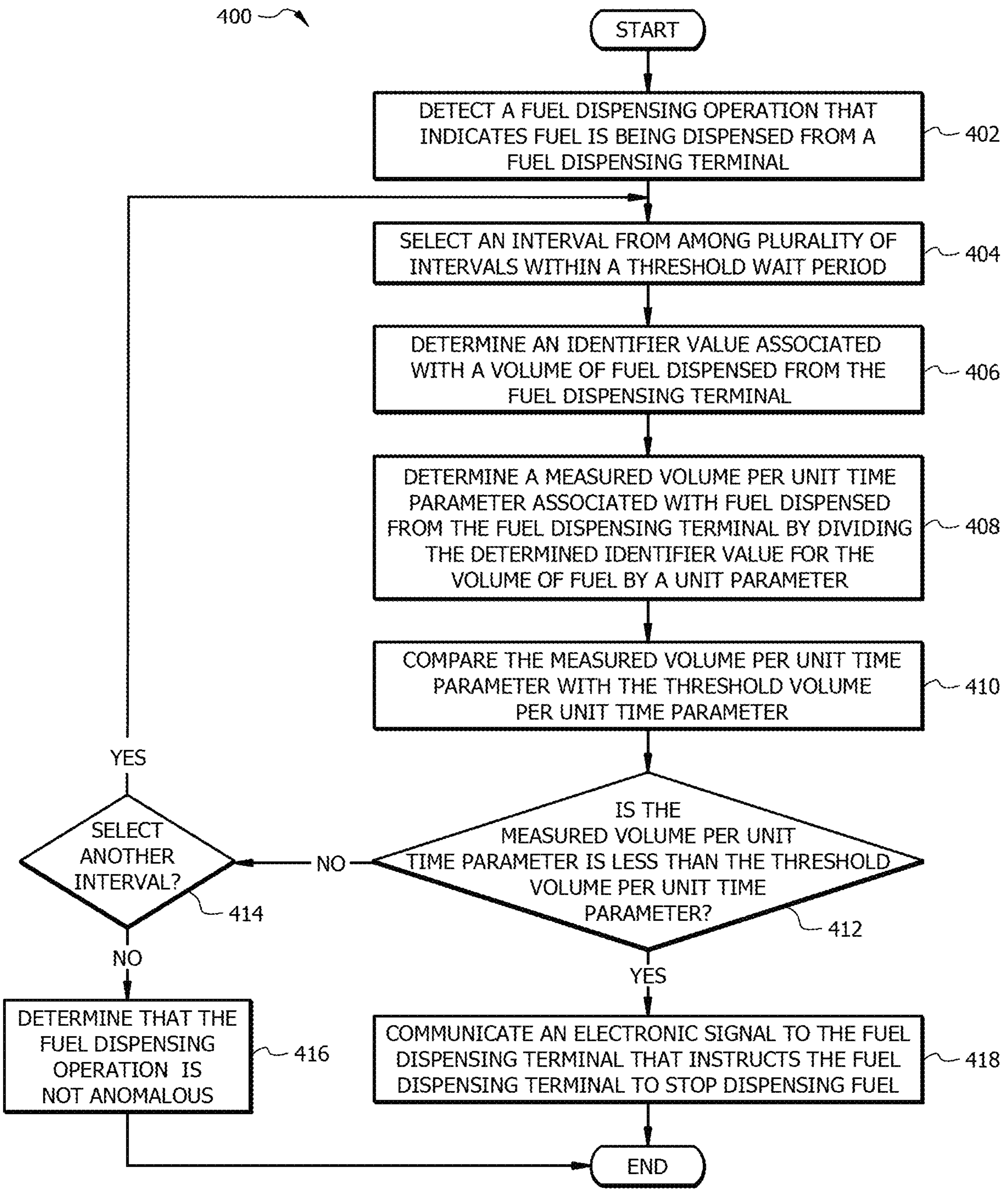
FIG. 4 illustrates an example flowchart of a method for anomaly detection at a fuel dispensing terminal while a fuel dispensing operation is ongoing.

FIG. 4 illustrates an example flowchart of a method 400 for anomaly detection during a fuel dispensing operation 160. Modifications, additions, or omissions may be made to method 400. Method 400 may include more, fewer, or other operations. For example, operations may be performed in parallel or in any suitable order. While at times discussed as the system 100, local controller 140, remote controller 180, fuel dispensing terminal 102, or components of any of thereof performing operations, any suitable system or components of the system may perform one or more operations of the method 400. For example, one or more operations of method 400 may be implemented, at least in part, in the form of software instructions 118, 148, and 188 of FIG. 1A, stored on non-transitory, tangible, machine-readable media (e.g., memories 116, 146, and 186 of FIG. 1A) that when run by one or more processors (e.g., processors 112, 142, and 182 of FIG. 1A) may cause the one or more processors to perform operations 402-418.

At operation 402, the local controller 140 detects a fuel dispensing operation 160 that indicates fuel is being dispensed from a fuel dispensing terminal 102. For example, the local controller 140 may detect the fuel dispensing operation 160 has begun when a sensor at the fuel dispensing terminal indicates that fuel has started to flow from a nozzle of the fuel dispensing terminal 102, similar to that described in FIG. 2.

At operation 404, the local controller 140 selects an interval 196 from among a plurality of intervals 196 within a threshold wait period 154. The local controller 140 may iteratively and incrementally select from the intervals 196. For example, assuming that the interval 196 is five seconds, the local controller 140 may select a first five seconds of the threshold wait period 154. The local controller 140 may iteratively and incrementally select an interval 196 until the end of the threshold wait period 154.

At operation 406, the local controller 140 determines an identifier value 194 associated with a volume of fuel 156 dispended from the fuel dispensing terminal 102. In this process, the local controller 140 determines the identifier value 194 dispensed from the start of the threshold wait period 154. For example, in a second iteration where the local controller 140 selects a second interval 196 at operation 404, the local controller 140 may determine an aggregate identifier value 194 associated with the volume of fuel 156 dispensed since the start of the threshold wait period 154.

At operation 408, the local controller 140 determines a measured volume per unit time parameter 150 associated with fuel dispensed from the fuel dispensing terminal 102 by dividing the determined identifier value 194 associated with the volume of fuel 156 by a unit parameter 192. An example operation of determining the measured volume per unit time parameter 150 is described in FIG. 2.

At operation 410, the local controller 140 compares the measured volume per unit time parameter 150 with the threshold volume per unit time parameter 152. At operation 412, the local controller 140 determines whether the measured volume per unit time parameter 150 is less than the threshold volume per unit time parameter 152. If the local controller 140 determines that the measured volume per unit time parameter 150 is less than the threshold volume per unit time parameter 152, method 400 proceeds to operation 418. If the local controller 140 determines that the measured volume per unit time parameter 150 is more than or equal to the threshold volume per unit time parameter 152, method 400 proceeds to operation 414.

At operation 414, the local controller 140 determines whether to select another interval 196. The local controller 140 determines to select another interval 196 if another interval 196 is left to the end of the threshold wait period 154. If the local controller 140 determines to select another interval 196, method 400 returns to operation 404. Otherwise, method 400 proceeds to operation 416.

At operation 416, the local controller 140 determines that the fuel dispensing operation 160 is not anomalous. The local controller 140 may analyze the fuel dispensing operation 160 until end of the threshold wait period 154. If the local controller 140 determines that the measured volume per unit time parameter 150 is more than or equal to the threshold volume per unit time parameter 152 by the end of the threshold wait period 154, the local controller 140 determines that the fuel dispensing operation 160 is not anomalous. The local controller 140 is also configured to determine whether it is an anomalous fuel dispensing operation 160 at any interval 196 within the threshold wait period 154.

At operation 418, the local controller 140 communicates an electronic signal 158 to the fuel dispensing terminal 102 that instructs the fuel dispensing terminal 102 to stop dispensing fuel. For example, the local controller 140 may communicate an electronic signal 158 that instructs the fuel dispensing terminal 102 to turn off. In another example, the local controller 140 may communicate an electronic signal 158 that causes one or more valves that control the fuel flow to close.

Although method 400 is described to be performed by the local controller 140. One of ordinary skill in the art would appreciate other embodiments in light of the present disclosure. For example, one or more operations of method 400 may be performed by the remote controller 180. In the same or another example, one or more operations of method 400 may be performed by the fuel dispensing terminal 102.

Example Method for Anomaly Detection after a Fuel Dispensing Operation

Figure 5:
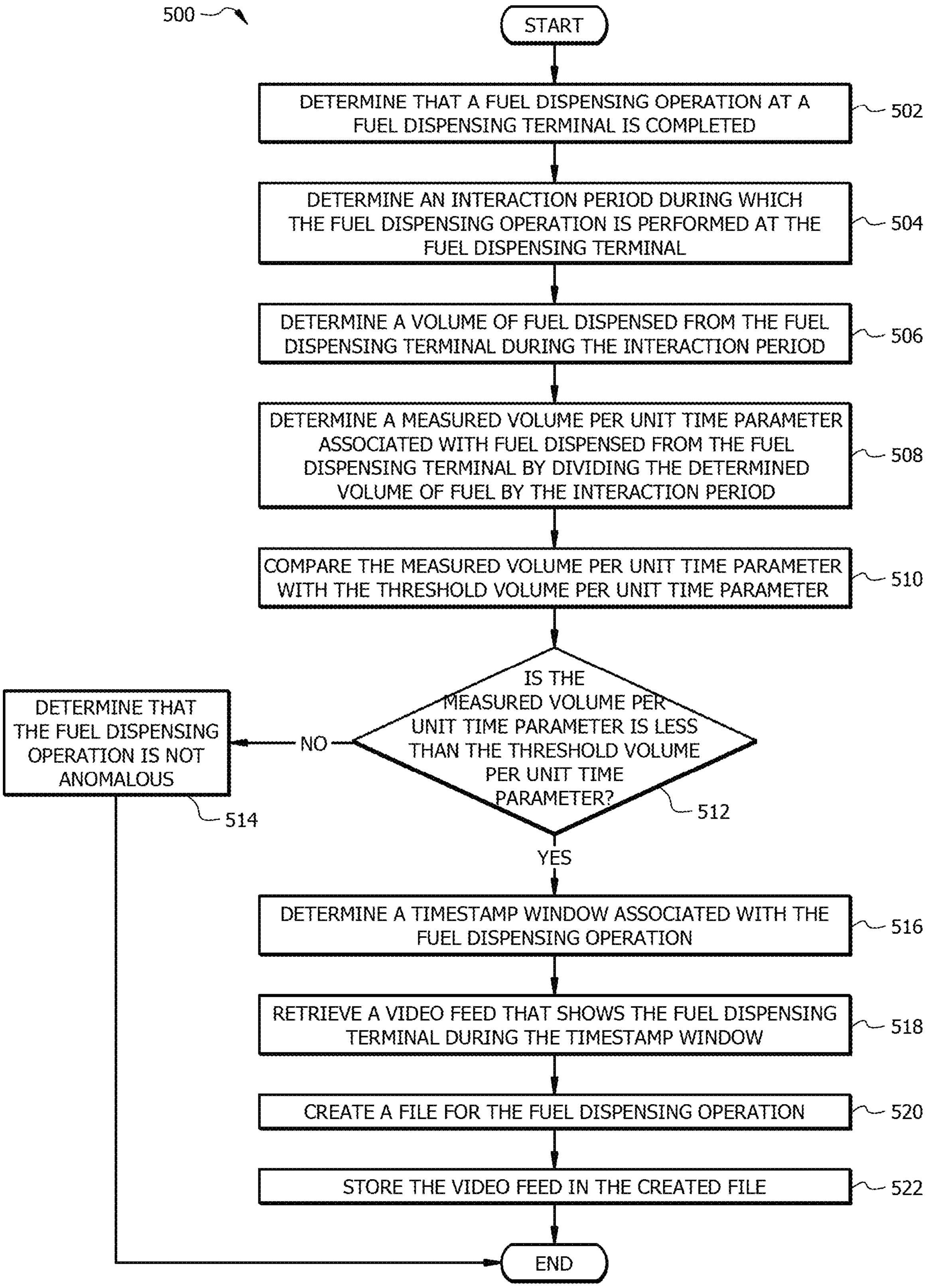
FIG. 5 illustrates an example flowchart of a method for anomaly detection at a fuel dispensing terminal after a fuel dispensing operation is completed.

FIG. 5 illustrates an example flowchart of a method 500 for anomaly detection after a fuel dispensing operation 160. Modifications, additions, or omissions may be made to method 500. Method 500 may include more, fewer, or other operations. For example, operations may be performed in parallel or in any suitable order. While at times discussed as the system 100, local controller 140, remote controller 180, fuel dispensing terminal 102, or components of any of thereof performing operations, any suitable system or components of the system may perform one or more operations of the method 500. For example, one or more operations of method 500 may be implemented, at least in part, in the form of software instructions 118, 148, and 188 of FIG. 1A, stored on non-transitory, tangible, machine-readable media (e.g., memories 116, 146, and 186 of FIG. 1A) that when run by one or more processors (e.g., processors 112, 142, and 182 of FIG. 1A) may cause the one or more processors to perform operations 502-522.

At operation 502, the local controller 140 determines that a fuel dispensing operation 160 at a fuel dispensing terminal 102 is completed. For example, the local controller 140 may determine that the fuel dispensing operation 160 is completed when the fuel flow stops at the fuel dispensing terminal 102 and/or when sensors at the fuel dispensing terminal 102 indicate that the nozzle is put back in place and the flow is stopped.

At operation 504, the local controller 140 determines an interaction period 302 during which the fuel dispensing operation 160 is performed at the fuel dispensing terminal 102. The local controller 140 determines the duration of the interaction period 302 by determining a difference between the start time and the end time of the fuel dispensing operation 160.

At operation 506, the local controller 140 determines a volume of fuel 156 dispensed from the fuel dispensing terminal 102 during the interaction period 302. At 508, the local controller 140 determines a measured volume per unit time parameter 150 associated with fuel dispensed from the fuel dispensing terminal 102 by dividing the determined volume of fuel 156 by the interaction period 302. An example operation for determining the measured volume per unit time parameter 150 is described in FIG. 3.

At operation 510, the local controller 140 compares the measured volume per unit time parameter 150 with the threshold volume per unit time parameter 152. At operation 512, the local controller 140 determines whether the measured volume per unit time parameter 150 is less than the threshold volume per unit time parameter 152. If the local controller 140 determines that the measured volume per unit time parameter 150 is less than the threshold volume per unit time parameter 152, method 500 proceeds to operation 516. Otherwise, method 500 proceeds to operation 514.

At operation 514, the local controller 140 determines that the fuel dispensing operation 160 is not anomalous. In other words, the local controller 140 determines that the fuel dispensing operation 160 is not malicious, i.e., the fuel dispensing terminal 102 is not manipulated by a bad actor.

At operation 516, the local controller 140 determines a timestamp window 164 associated with the fuel dispensing operation 160. The timestamp window 164 may have a same duration as the interaction period 302. For example, timestamp window 164 may be included in the event logs 178. The timestamp window 164 may indicate a time and calendar date when the fuel dispensing operation 160 occurs. The local controller 140 may determine the timestamp window 164 from the event logs 178.

At operation 518, the local controller 140 retrieves a video feed 162 that shows the fuel dispensing terminal 102 during the timestamp window 164. The local controller 140 may retrieve the video feed 162 from the camera 106 that is facing the space where the fuel dispensing terminal 102 is located.

In certain embodiments, the video feed 162 among other video recordings by the cameras 106 may be stored in the event logs 178, and the local controller 140 may retrieve the video feed 162 from the event log 178. For example, the local controller 140 may search for the video feed 162 based on the metadata associated with the fuel dispensing operation 160. For example, each fuel dispensing operation 160 may be linked and associated with its respective fuel dispensing terminal 102, timestamp window 164, volume of fuel 156, measured volume per unit time parameter 150, interaction period 302, video feed 162 among others, and stored in the event logs 178. When the local controller 140 determines that the fuel dispensing operation 160 is anomalous, the local controller 140 may search the event logs 178 to find the video feed 162 that shows the fuel dispensing operation 160 during the particular timestamp window 164 that is linked to the fuel dispensing operation 160.

At operation 520, the local controller 140 creates a file 170 for the fuel dispensing operation 160. At operation 522, the local controller 140 stores the video feed 162 in the created file 170. The local controller 140 may store other data/information in the file 170, including the user information 166, vehicle information 168, dispensed fuel amount 304, and/or any other suitable data/information.

Although method 500 is described to be performed by the local controller 140, one of ordinary skill in the art would appreciate other embodiments in light of the present disclosure. For example, one or more operations of method 500 may be performed by the remote controller 180. In the same or another example, one or more operations of method 500 may be performed by the fuel dispensing terminal 102.

Figure 6:
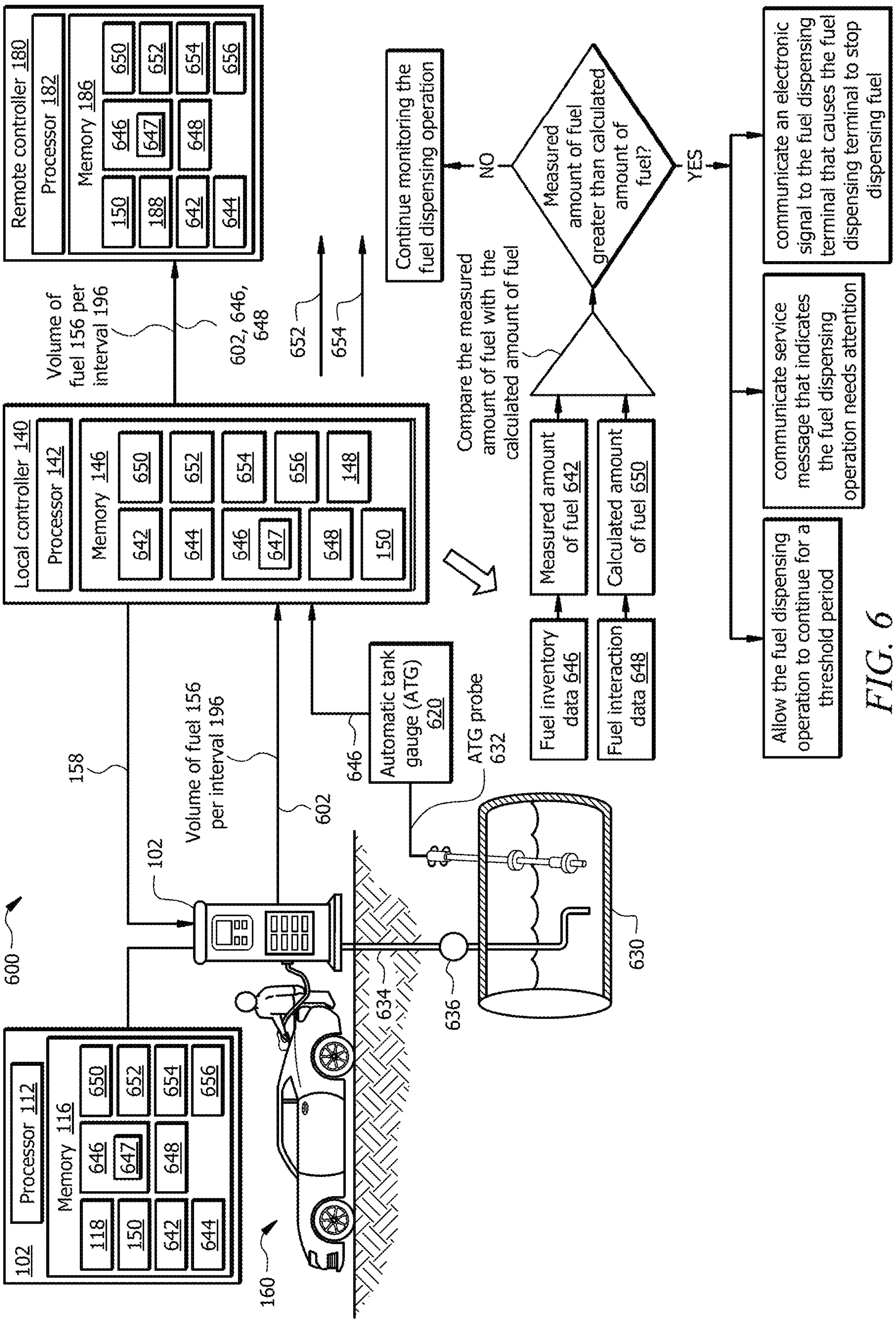
FIG. 6 illustrates an example system and operational flow for anomaly detection during fuel dispensing operation using fuel volume determinations.

Example System for Anomaly Detection During Fuel Dispensing Operations Using Fuel Volume Determinations FIG. 6 illustrates an example system 600 and its operational flow for anomaly detection during fuel dispensing operation using fuel volume determinations. In certain embodiments, the system 600 may include one or more components of the system 100 described in FIG. 1A. In certain embodiments, the system 600 may include one or more fuel dispensing terminals 102, local controller 140, remote controller 180, an automatic tank gauge (ATG) component 620, a fuel tank 630, and an ATG probe 632. Aspects of the fuel dispensing terminals 102, local controller 140, and remote controller 180 are described in the discussion of FIGS. 1A to 5, and additional aspects are described below. For example, in certain embodiments, fuel dispensing terminal 102 may be configured to perform one or more of the operations of the operational flow of system 600 when the software instructions 118 are executed by the processor 112. In the same or another example, in certain embodiments, the local controller 140 may be configured to perform one or more of the operations of the operational flow of system 600 when the software instructions 148 are executed by the processor 142. In the same or another example, in certain embodiments, the remote controller 180 may be configured to perform one or more of the operations of the operational flow of system 600 when the software instructions 188 are executed by the processor 182). The system 600 may be configured as shown or in other configuration suitable to perform the operations described herein.

In general, the system 600 improves the techniques for detecting and validating anomalous fuel dispensing operations, and mitigating unauthorized access to fuel at a fuel station in conjunction with an anomalous fuel dispensing operation. In certain embodiments, the system 600 is configured to leverage fuel levels at a fuel tank to validate whether a detection of an anomalous fuel dispensing operation is accurate or a false positive.

In an example scenario, assume that any suitable technique is used to detect an anomalous fuel dispensing operation, such as detecting an unexpectedly slow fuel flow rate, similar to that that described in FIGS. 1A to 7 or any other anomalous fuel dispensing detection technique. As discussed in FIG. 1A, a pulsar rod is a component inside a fuel dispensing terminal 102 that is configured to rotate when fuel is dispensed from the fuel dispensing terminal 102. The pulser rod is configured to rotate at a predetermined speed. The rotating of the pulsar rod is used to measure the flow rate of fuel that is being dispensed. The speed of rotating the pulsar rod is proportional to the fuel flow rate. If the pulsar rod is manipulated to rotate slower, the fuel flow rate can be fabricated to show a slower flow rate than what it actually is. A slow fuel flow rate may be due to the pulser rod being manipulated to rotate slower than the predetermined speed.

Figure 7:
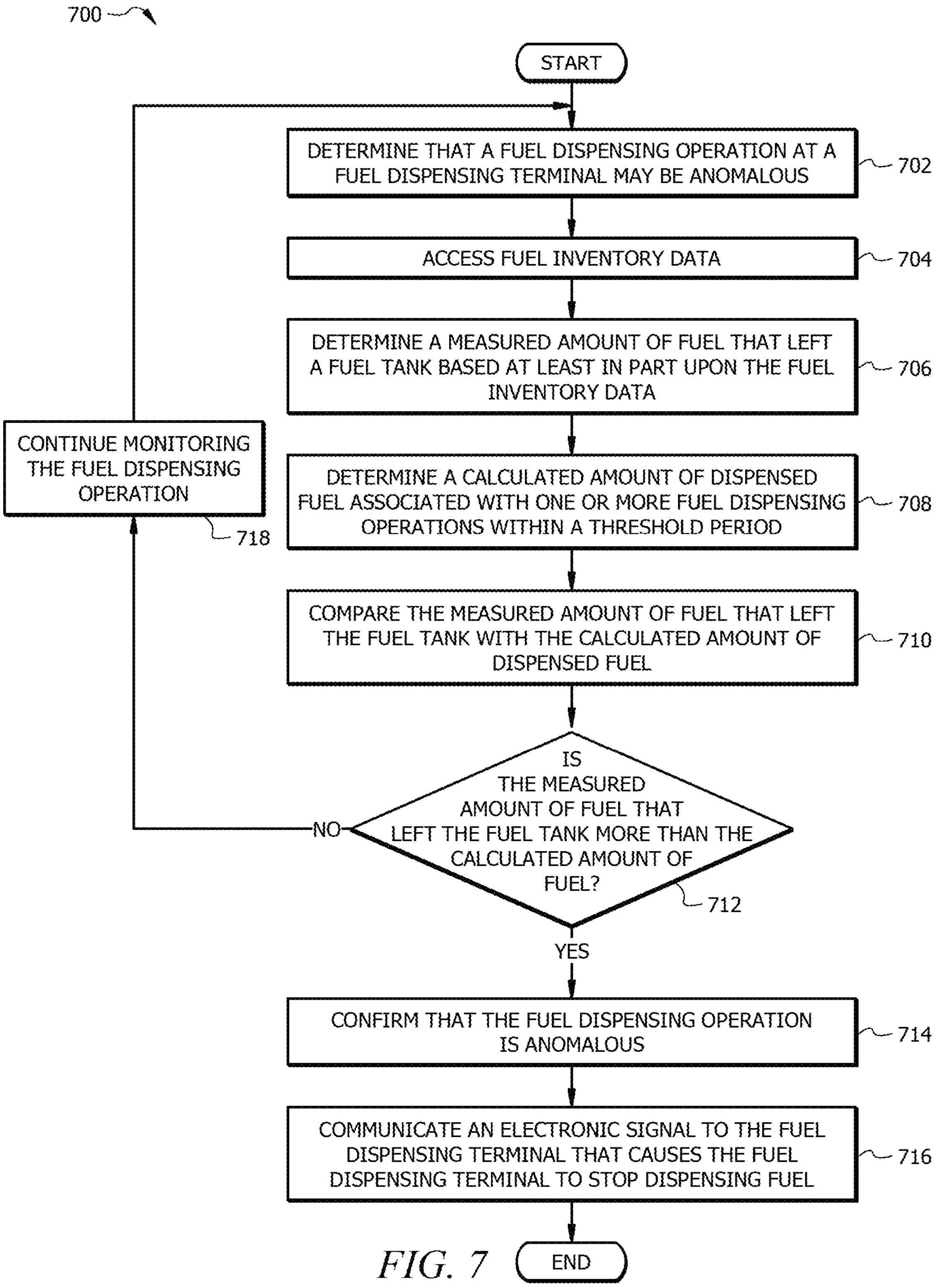
FIG. 7 illustrates an example flowchart of a method for anomaly detection during fuel dispensing operation using fuel volume determinations.

The system 600 is configured to use the detected slow fuel flow rate as a trigger, in one embodiment, to initiate the operational flow illustrated in FIG. 6 and the method 700 illustrated in FIG. 7 to validate (or confirm) the anomalous fuel dispensing operation. In an example operation, the system 600 may access fuel inventory data 646 that indicates fuel levels at the fuel tank 630. The fuel inventory data 646 may represent fuel levels at the fuel tank 630 for a past threshold period 644. The past threshold period 644 may be, for example, thirty minutes, an hour, two hours, and the like. The system 600 may determine the actual amount of fuel 642 that left the fuel tank 630 in the past threshold period 644 based on the fuel inventory data 646. The actual amount of fuel 642 may interchangeably be referred to herein as a measured amount of fuel 642. The system 600 may also determine a calculated amount of fuel 650 associated with one or more fuel dispensing operations in the past threshold period 644. The system 600 may compare the actual amount of fuel 642 that left the fuel tank 630 in the past threshold period 644 with the calculated amount of fuel 650.

If the fuel dispensing terminal 102 is tampered with to have a fuel flow rate less than an expected fuel flow rate (similar to that described in FIGS. 1-3), the calculated amount of fuel 650 may reflect the manipulated slow fuel flow rate. In other words, because the calculated amount of fuel 650 is determined based on the aggregated fuel sales (as indicated in the fuel interaction data 648), if the fuel dispensing terminal 102 is tampered with to have a manipulated slow fuel flow rate leads to an incorrect number for the aggregated fuel sales and therefore, an incorrect calculated amount of fuel 650. This, in turn, leads to the actual amount of fuel 642 that left the fuel tank 630 in the past threshold period 644 to not correspond to the calculated amount of fuel 650. In some cases, if the fuel dispensing terminal 102 is tampered with to have a fuel flow rate less than an expected fuel flow rate (similar to that described in FIGS. 1-3), the actual amount of fuel 642 that left the fuel tank 630 in the past threshold period 644 may not be within a threshold volume gap from the calculated amount of fuel 650. The fuel dispensing terminal 102 may have a fuel flow rate less than the expected fuel flow rate, if a bad actor manipulates a pulser rod of the fuel dispensing terminal 102 to rotate slower than a predetermined and known speed, similar to that described in FIGS. 1-3. Therefore, in some cases, the discrepancy between the actual amount of fuel 642 that left the fuel tank 630 and the calculated amount fuel 650 may be an indication of the fuel dispensing terminal 102 being tampered with to have a fuel flow rate less than the expected fuel flow rate—i.e., fuel theft.

In one example, if it is determined that the actual amount of fuel 642 that left the fuel tank 630 is more than the calculated amount of fuel 650, the system 600 may confirm that the fuel dispensing operation 160 is anomalous, such as that fuel theft is occurring. In another example, if it is determined that the actual amount of fuel 642 that left the fuel tank 630 is more than the calculated amount of fuel 650 and that the gap between the actual amount of fuel 642 and the calculated amount of fuel 650 is more than a predetermined fuel volume 656, the system 600 may confirm that the fuel dispensing operation 160 is anomalous. The use of the predetermined fuel volume 656 in this comparison may help to reduce false positive indications of anomalous fuel dispensing operations.

In certain embodiments, in response to confirming that the fuel dispensing operation 160 is anomalous, the system 600 may communicate an electronic signal 158 to the fuel dispensing terminal 102 that causes the fuel dispensing terminal 102 to stop dispensing fuel. In certain embodiments, in response to confirming that the fuel dispensing operation 160 is anomalous, the system 600 may communicate a service message 652 that indicates the fuel dispensing operation 160 at the fuel dispensing terminal 102 needs attention. The service message 652 may be sent to a computing device associated with an on-site representative, a computing device at a gas station, and the like, for example.

In certain embodiments, in response to confirming that the fuel dispensing operation 160 is anomalous, the system 600 may allow the fuel dispensing operation 160 to continue for a period of time. This operation may lead the bad actor who is performing or contributing to the anomalous fuel dispensing operation 160 to continue their operation, stay at the fuel dispensing terminal 102, and not be alerted until authorities (such as law enforcement officers, representatives, etc.) arrive at the fuel dispensing terminal 102 and question or even apprehend the bad actor.

In this manner, the system 600 provides technical advantages and improvements in fuel dispensing operations at gas stations. Furthermore, the system 600 provides the practical applications of detecting anomalous fuel dispensing operations 160 and improving the accuracy in detecting and validating an anomalous fuel dispensing operation 160 that was suspected based on a slow fuel flow rate, or any other suitable trigger.

In some cases, a single operation to determine whether a fuel dispensing operation 160 is anomalous may not be sufficient with the large amount of data to process and may lead to false positive detections or even not detecting an anomalous fuel dispensing operation 160 if the gap/margin between a calculated amount of fuel that was dispensed (that was determined based on manipulated slow fuel flow rate) and an actual amount of fuel that was dispensed is sufficiently small (e.g., smaller than the predetermined volume). The system 600 and its operational flow provide a technical solution to this and other technical problems in the detection and validation of anomalous fuel dispensing operations 160 currently arising in the field of fuel dispensing operations and fuel theft prevention at gas stations. In particular, the system 600 provides an unconventional method to leverage fuel levels at the fuel tank 630 to validate a suspected (or anomalous) fuel dispensing operation 160. In other words, the system 600 provides a multi-validation technique for validating suspected (or anomalous) fuel dispensing operations 160 to reduce false detections of anomalous fuel dispensing operations and increase the accuracy in the detections of anomalous fuel dispensing operations.

ATG Component

The automatic tank gauge (ATG) component 620 may be a hardware fuel level monitoring device and is generally configured to detect levels of fuel in the fuel tank 630. The ATG component 620 may be used to monitor and manage the inventory of fuel (and/or other liquids) in tanks 630. The ATG component 620 may be operably coupled to an ATG probe 632. In some embodiments, each ATG probe 632 is a long cylindrical rod made of durable materials such as stainless steel. In some embodiments, the rod of the ATG probe 632 may be attached to floats or sensors. In some embodiments, the ATG probe 632 may include electronic components and sensors configured to measure liquid levels, such as fuel level and water level present in the fuel tank 630. For example, the ATG 620 and ATG probe 632 may measure both fuel and water levels via two different floats based on differences in fluid density of fuel and water. The ATG 620 may be configured according to safety compliance standards to stop the flow of fuel from the tank 630 if actual fuel level at the tank 630 does not correspond to the fuel level records determined based on fuel sales. In some cases, this operation may be used to reduce fuel leak from the tank 630 in case a leak at the tank 630 has caused the discrepancy between the actual fuel level at the tank 630 and the fuel level records. The ATG 620 may be connected to the ATG probe 632 with wires or cables. The ATG probe 632 may transmit fuel level data 647 collected by the probe sensors to the ATG 620 by the wires or cables.

The position of the float indicates how much fuel is present in the tank. The ATG component 620 may further include a console that has a display, a keypad, and status lights that may signal alarm conditions. The ATG component 620 may be operably coupled to the ATG probe 632 wirelessly or by wires. As shown in FIG. 6, in one embodiment, the ATG probe 632 is placed inside the fuel tank 630 and connected to the ATG component 620. The ATG probe 632 may be configured to measure the level of fuel inside the tank 630 and generate a signal that indicates the measured level of fuel. The ATG probe 632 may communicate the signal to the ATG component 620. The ATG component 620 may generate fuel inventory data 646 that includes the levels of fuel at the fuel tank 630 (collected by the ATG probe 632), e.g., determined at various intervals, such as every minute, every two minutes, every three minutes, and the like. In other words, the fuel inventory data 646 may include the fuel level data 467 that indicates the fuel levels measured at intervals by the ATG probe 632. The ATG component 620 may communicate fuel inventory data 646 to the local controller 140. The ATG component 620 may be operably coupled to the local controller 140 via wires or wirelessly. The local controller 140 may use the fuel inventory data 646 for further processing, including validating whether a suspected fuel dispensing operation is actually anomalous. This operation is described in greater detail further below in conjunction with the operational flow of the system 600.

Aspects of the local controller 140 are described in FIGS. 1A to 5, and additional aspects are described below. The memory 146 may further store actual amount of fuel 642, threshold period 644, fuel inventory data 646, fuel interaction data 648, calculated amount of fuel 650, service message 652, alert message 654, predetermined fuel volume 656, measured volume per unit time parameter 150, software instructions 148, and/or any other instructions/data descried herein.

In certain embodiments, the memory 116 of the fuel dispensing terminal 102 may store software instructions 118, actual amount of fuel 642, threshold period 644, fuel inventory data 646, fuel interaction data 648, calculated amount of fuel 650, service message 652, alert message 654, predetermined fuel volume 656, measured volume per unit time parameter 150, and/or any other instructions/data described herein.

In certain embodiments, the memory 186 of the remote controller 180 may store software instruction 188, actual amount of fuel 642, threshold period 644, fuel inventory data 646, fuel interaction data 648, calculated amount of fuel 650, service message 652, alert message 654, predetermined fuel volume 656, measured volume per unit time parameter 150, and/or any other instructions/data described herein.

Operational Flow for Anomaly Detection During Fuel Dispensing Operations Using Fuel Volume Determinations The operational flow of system 600 may begin when a fuel dispensing operation 160 is initiated by a user, similar to that described in FIG. 2. For example, the user may park their vehicle at the fuel dispensing terminal 102 and initiate a request (e.g., request 172 in FIG. 2) to the fuel dispensing terminal 102 to dispense fuel. The user may initiate a request, e.g., by presenting their card data to the fuel dispensing terminal 102. The user may be verified by the local controller 140, fuel dispensing terminal 102, and/or the remote controller 180, similar to that described in FIG. 1A. For example, when the user is verified, they may start operating the fuel dispensing terminal 102. Is response, the local controller 140 may detect that a fuel dispensing operation 160 is started and fuel starts to flow from the nozzle of the fuel dispensing terminal 102. This fuel flow rate 602 is communicated from the fuel dispensing terminal 102 to the local controller 140. This indicates that the fuel dispensing operation 160 has begun.

The local controller 140 may determine whether the fuel dispensing operation 160 is associated with an anomaly. The anomaly may be similar to the anomaly described in the discussion of FIGS. 1A to 7. For example, the anomaly may indicate a malicious attempt to manipulate components (e.g., pulser rod) of the fuel dispensing terminal 102 to fabricate a faulty fuel dispensing flow rate that is slower than the actual fuel flow rate out of the nozzle of the fuel dispensing terminal 102.

When the fuel dispensing operation 160 begins, a pump 636 (controlled by a motor associated with the fuel dispensing terminal 102) extracts fuel from the tank 630 and provides it to a hose connected to the fuel dispensing terminal 102 through the fuel pipe 634. When the nozzle at the head of the hose is opened, fuel can flow out of the nozzle.

Determining Whether the Fuel Dispensing Operation May be Anomalous

In certain embodiments, the local controller 140 may determine a measured volume per unit time parameter 150, similar to that described in FIG. 2, as a precursor for evaluating the anomalous fuel dispensing operation using fuel levels and fuel interaction data, as described below and with reference to FIG. 7. In other embodiments, the evaluation of fuel dispensing operations using fuel levels and fuel interaction data may be performed as a stand-alone operation without first performing these operations as a trigger.

The measured volume per unit time parameter 150 may represent the measured fuel flow rate during the fuel dispensing operation 160. For example, in certain embodiments, in order to determine the measured fuel volume per unit time parameter 150, the local controller 140 may perform certain measurements and calculations within a threshold wait period (154 in FIG. 2). In response to detecting the fuel dispensing operation 160, the local controller 140 may perform the following operations at each predetermined interval 196 from among a plurality of predetermined intervals 196 within the threshold wait period (154 in FIG. 2). The predetermined interval 196 may be five seconds, ten seconds, or any other suitable interval. The predetermined time interval 196 may be associated with the threshold wait period (154 in FIG. 2).

The local controller 140 may determine a volume of fuel 156 dispensed from the fuel dispensing terminal 102. By the end of the threshold wait period (154 in FIG. 2), the local controller 140 has determined an aggregate value for the volume of fuel pumped (i.e., dispensed) from the fuel dispensing terminal 102. This aggregate value of the dispensed fuel 156 may be fabricated and manipulated as a result of manipulating the pulser rod of the fuel dispensing terminal 102 by a bad actor, similar to that described in FIG. 1A. In other words, this aggregate value of dispensed fuel 156 may be faulty (i.e., manipulated) and not representative of an expected amount of fuel pumped for the duration of the threshold wait period (154 in FIG. 2) if a bad actor has manipulated the pulser rod component to turn slower than a speed that the pulse rod would have turned without manipulation. The local controller 140 may determine the measured volume per unit time parameter 150 associated with fuel dispensed from the fuel dispensing terminal 102 by dividing the identifier value 194 (see FIG. 2) associated with the determined volume of fuel 156 by a unit parameter 192 (see FIG. 2). In certain embodiments, the local controller 140 may wait for a particular time period (e.g., ten seconds, fifteen seconds, or any other suitable period) from when fuel starts to flow to determine the volume of fuel 156 per interval 196 and the measured volume per unit time parameter 150. Waiting for a particular time period before performing the operations described above may improve the accuracy of the measured volume per unit time parameter 150.

In certain embodiments, the operations for determining the measured volume per unit time parameter 150 described herein may be performed by the remote controller 180. For example, when the fuel dispensing operation 160 begins, the fuel dispensing terminal 102 and/or the local controller 140 may communicate a message indicating that the fuel dispensing operation 160 has started to the remote controller 180. The fuel dispensing terminal 102 and/or the local controller 140 may communicate the volume of fuel 156 dispensed per interval 196 and flow rate 602 to the remote controller 180. The remote controller 180 may perform certain measurements and calculations within a threshold wait period 154, similar to that described above to determine the measured volume per unit time parameter 150. In certain embodiments, the remote controller 180 may wait for a particular time period (e.g., ten seconds, fifteen seconds, or any other suitable period) from when fuel starts to flow to determine the volume of fuel 156 per interval 196 and the measured volume per unit time parameter 150.

In certain embodiments, the operations for determining the measured volume per unit time parameter 150 described herein may be performed by the fuel dispensing terminal 102. The fuel dispensing terminal 102 may be configured to determine the measured fuel volume per unit time parameter 150. For example, when the fuel dispensing operation 160 begins, the fuel dispensing terminal 102 may determine a volume of fuel 156 dispensed per interval 196, e.g., via one or more sensors. The fuel dispensing terminal 102 may perform certain measurements and calculations within a threshold wait period 154, similar to that described above to determine the measured volume per unit time parameter 150. In certain embodiments, the fuel dispensing terminal 102 may wait for a particular time period (e.g., ten seconds, fifteen seconds, or any other suitable period) from when fuel starts to flow to determine the volume of fuel 156 per interval 196 and the measured volume per unit time parameter 150.

The measured volume per unit time parameter 150 may be determined based on identifier values (194 in FIG. 2), similar to that described in FIG. 2. For example, at each predetermined interval from among a plurality of intervals, an identifier value (194 in FIG. 2) associated with a volume of fuel dispensed from the dispensing terminal 102 may be determined.

In certain embodiments, the threshold wait period (154 in FIG. 2) may be more than the unit time parameter (as described in the discussion of FIG. 2), e.g., more than one minute. In such embodiments, the measured fuel volume (e.g., the aggregate fuel volume from the start of the detection process until a respective interval 196) may be determined by dividing the determined identifier value (194 in FIG. 2) by a unit parameter (192 in FIG. 2). In such embodiments, the measured fuel volume per unit time parameter 150 associated with fuel dispensed from the fuel dispensing terminal 102 may be determined by dividing the determined aggregate measured fuel by the unit time parameter as described in the discussion of FIG. 2).

In certain embodiments, the threshold wait period (154 in FIG. 2) may be one minute e.g., an example unit time parameter. In such embodiments, a measured fuel volume per unit time parameter 150 associated with fuel dispensed from the fuel dispensing terminal 102 may be determined, for example, by dividing the determined identifier value (194 in FIG. 2) by a unit parameter (192 in FIG. 2). Therefore, in certain embodiments, if the threshold wait period (154 in FIG. 2) is one minute and aggregated fuel volume at the end of the threshold wait period (154 in FIG. 2) may be with respect to per minute. If, however, the threshold wait period (154 in FIG. 2) is more than one minute, the aggregated fuel volume determined at the end of the wait period (154 in FIG. 2) may be divided by the number of minutes during the threshold wait period (154 in FIG. 2).

The measured fuel volume per unit time parameter 150 may be compared with the threshold fuel volume per unit time parameter (as described in the discussion of FIG. 2). If the measured fuel volume per unit time parameter 150 is less than the threshold fuel volume per unit time parameter (as described in the discussion of FIG. 2), it may be determined that the fuel dispensing operation 160 may be anomalous. Otherwise, the local controller 140 may determine that the fuel dispensing operation 160 may not be anomalous.

In certain embodiments, the operation of determining the measured volume per unit time parameter 150 may be performed by the local controller 140. In certain embodiments, the operation of determining the measured volume per unit time parameter 150 may be performed by the remote controller 180. In certain embodiments, the operation of determining the measured volume per unit time parameter 150 may be performed by the fuel dispensing terminal 102.

Evaluating the Anomalous Fuel Dispensing Operation Using Fuel Levels and Fuel Interaction Data In the illustrated embodiment of FIG. 6, the local controller 140 is shown to perform the evaluation of suspected anomalous fuel dispensing operation 160. In other embodiments, any number and combination of the fuel dispensing terminal 102, the local controller 140, and the remote controller 180 may evaluate the suspected anomalous fuel dispensing operation 160. The suspicion (or determination) of the anomalous fuel dispensing operation 160 based on the flow rate 602, measured volume per unit time parameter 150, and threshold volume per unit time parameter 152 (see FIG. 2) may be used as a trigger, in one embodiment, to evaluate the anomalous fuel dispensing operation 160. In this process, the suspicion (or determination) of the anomalous fuel dispensing operation 160 based on the flow rate 602, measured volume per unit tine parameter 150, and threshold volume per unit time parameter 152 (see FIG. 2) may be used as a trigger to query fuel level measurements at the tank 630 and historical fuel interactions at the gas station to confirm whether the determination of the anomalous fuel dispensing operation 160 was accurate. However, it should be understood that in some embodiments, the evaluation of anomalous fuel dispensing operations using fuel levels and fuel interaction data (as described below and with respect to FIG. 7) may be performed as a stand-alone operation without first performing other operations as a trigger.

In some embodiments, fuel level measurements and historical fuel interactions may be narrowed down to those fuel level measurements and historical fuel interactions observed in the past threshold period 644. Thus, the suspicion (or determination) of the anomalous fuel dispensing operation 160 based on the flow rate 602, measured volume per unit time parameter 150, and threshold volume per unit time parameter 152 (see FIG. 2) may be used as a trigger to query fuel levels at the tank 630 (e.g., for the past threshold period 644) and historical fuel interaction data (e.g., for the past threshold period 644) in evaluation of the anomalous fuel dispensing operation 160. To this end, the local controller 140 may query for fuel level data 467 (also referred to herein as ATG data) that includes fuel levels within the past threshold period 644 in the fuel inventory data 646. For example, the local controller 140 may query (e.g., search) for the fuel inventory data 646 that includes fuel levels at the fuel tank 630 for the past threshold period 644 from the start of the validation process for the fuel dispensing operation 160. In response, the local controller 140 may access a particular fuel inventory data 646 that indicates fuel levels in the tank 630 within the past threshold period 644. The local controller 140 may determine an actual amount of fuel 642 that left the fuel tank 630 during the past threshold period 644 based on the fuel inventory data 646.

The local controller 140 may query (e.g., search) for fuel interaction data 648 associated with an aggregated fuel request at the fuel station from the start of the validation of anomalous fuel dispensing operation process to the completion of the past threshold period 644. The aggregated fuel requests may be from one or more users and/or one or more fuel dispensing operations 160 at one or more fuel dispensing terminals 102. For example, during crowded hours at the fuel station, the fuel interaction data 648 may be associated with multiple users dispensing fuel. The fuel interaction data 648 associated with the threshold period 644 may indicate an identifier value (element 194 in FIG. 2) associated with the aggregated fuel requests made by one or more users during one or more fuel dispensing operations 160 at one or more fuel dispensing terminals 102 within the threshold period 644 at the fuel station.

In certain embodiments, the identifier value (element 194 in FIG. 2) may represent a total amount charged for the aggregated fuel requests. Thus, in certain embodiments, the fuel interaction data 648 associated with the threshold period 644 may indicate the total amount charged for the aggregated fuel requests made by one or more users during one or more fuel dispensing operations 160 at one or more fuel dispensing terminals 102 within the threshold period 644 at the fuel station.

The local controller 140 may determine a calculated amount of dispensed fuel 650 requested by one or more users and associated with one or more fuel dispensing operations 160 within the past threshold period 644 based on the fuel interaction data 648. In this process, for example, the local controller 140 may determine the calculated amount of dispensed fuel 650 by adding the fuel charges made to the one or more users for the one or more fuel dispensing operations 160 within the past threshold period 644. The local controller 140 may then divide the total fuel charges (for the past threshold period 644) by fuel cost per unit volume (e.g., fuel cost per gallon, fuel cost per liter, etc.). The result of this equation, referred to as the calculated amount of dispensed fuel 650, corresponds to the total amount of fuel that is sold to the one or more users for one or more fuel dispensing operations 160 within the past threshold period 644. In certain embodiments, the fuel interaction data 648 may include fuel transactions conducted for fuel requests at the fuel station. The fuel interaction data 648 may include the identifier value (element 194 in FIG. 2) associated with the total volume of requested fuel. The local controller 140 may determine the calculated amount of dispensed fuel 650, for example, by dividing an identifier value (element 194 in FIG. 2) associated with the total volume of requested fuel by a unit parameter (element 192 in FIG. 2). In this example, the identifier value (element 194 in FIG. 2) may represent the aggregated fuel cost for the amount of fuel charged to the one or more users for the one or more fuel dispensing operations 160 within the past threshold period 644, and the unit parameter (element 192 in FIG. 2) may represent the fuel cost per unit fuel volume (e.g., fuel cost per gallon, fuel cost per liter, etc.).

Determining Whether there is a Gap Between a Measured Amount of Fuel that Left a Tank and a Calculated Amount of Dispensed Fuel The local controller 140 may compare the actual amount of fuel 642 that left the fuel tank 630 with the calculated amount of dispensed fuel 650 (e.g., determined as discussed above). In certain embodiments, if the local controller 140 determines that the actual amount of fuel 642 that left the tank 630 is more than the calculated amount of dispensed fuel 650, the local controller 140 may confirm that the fuel dispensing operation 160 is anomalous.

In certain embodiments, if the local controller 140 determines that the actual amount of fuel 642 that left the tank 630 is more than the calculated amount of dispensed fuel 650 and that the gap between the actual amount of fuel 642 and the calculated amount of dispensed fuel 650 is more than a predetermined fuel volume 656, the local controller 140 may confirm that the fuel dispensing operation 160 is anomalous. The predetermined fuel volume 656 may be any suitable volume that could be indicative of an anomalous fuel dispensing operation (e.g., fuel theft) based on, for example, historical data, the size of the fuel tank 630, the period of time in the threshold period 644, and the like. For example, historical data associated with prior instances of fuel theft at the fuel station may suggest that fuel theft is occurring when a certain volume discrepancy is found between the actual amount of fuel 642 that left the fuel tank 630 and the calculated amount of dispensed fuel 650 during the same threshold period. That volume discrepancy from prior instances of fuel theft can be used to determine an appropriate predetermined fuel volume 656 to be used in this operation. In an alternate example, the predetermined fuel volume 656 may be a certain fractional percentage of the overall size of the fuel tank 630 that is indicative of fuel theft. In still another alternate example, the predetermined fuel volume 656 may be set based on the length of time elapsed in the threshold period of time (e.g., larger predetermined fuel volume 656 for a longer threshold period 644).

In certain embodiments, in response to confirming that the fuel dispensing operation 160 is anomalous, the local controller 140 may communicate an electronic signal 158 to the fuel dispensing terminal 102 that causes the fuel dispensing terminal 102 to stop dispensing fuel.

In certain embodiments, in response to confirming that the fuel dispensing operation 160 is anomalous, the local controller 140 may communicate a service message 652 that indicates the fuel dispensing operation 160 at the fuel dispensing terminal 102 needs attention. For example, the service message 652 may be sent to a computing device associated with an on-site representative, a computing device at the fuel station, the fuel dispensing terminal 102, the remote controller 180, or the like.

In certain embodiments, in response to confirming that the fuel dispensing operation 160 is anomalous, the local controller 140 may communicate an alert message 654 that indicates a discrepancy between the actual amount of fuel 642 that left the fuel tank 630 and the calculated amount of dispensed fuel 650. For example, the alert message 654 may be sent to a computing device associated with an on-site representative, a computing device at the fuel station, the fuel dispensing terminal 102, the remote controller 180, a computing device associated with a law enforcement officer, or the like.

In certain embodiments, in response to confirming that the fuel dispensing operation 160 is anomalous, the local controller 140 may allow for the fuel dispensing operation 160 to continue for a period of time (e.g., N minutes, where N can be any number greater than 0). In this way, the bad actor (performing or associated with the anomalous fuel dispensing operation 160) may not be alerted and stay at the fuel dispensing terminal 102 until authorities such as law enforcement officers and/or representatives arrive at the fuel dispensing terminal 102 and question (or even apprehend) the bad actor.

In certain embodiments, before determining whether the fuel dispensing operation 160 may be anomalous, the local controller 140 may determine a fuel grade of the fuel being dispensed during the fuel dispensing operation 160. In other words, the local controller 140 may determine that the fuel dispensing operation 160 is associated with a particular fuel grade (e.g., premium fuel, mid-grade fuel, regular, diesel, etc.). In such embodiments, data related to the fuel grade may be used in the operations described above. For example, the local controller 140 may query, search for, and access fuel inventory data 646 that is associated with the fuel grade in question and determine the actual amount of fuel 642 associated with the fuel grade that left the tank 630 based on the fuel inventory data 646. Similarly, the local controller 140 may query, search for, and access fuel interaction data 648 associated with the fuel grade in question and determine the calculated amount of fuel 650 with the fuel grade based on the fuel interaction data 648. In this manner, the fuel data is narrowed down to the particular fuel grade in question. Therefore, the accuracy in validation of the anomalous fuel dispensing operation 160 may be increased further compared to when fuel data for all fuel grades is evaluated in the aggregate.

In certain embodiments, the remote controller 180 may perform similar operations to validate a suspected (or anomalous) fuel dispensing operation 160. For example, the local controller 140 may communicate the fuel inventory data 646 and fuel interaction data 648 to the remote controller 180. The remote controller 180 may determine the actual amount of fuel 642 that left the fuel tank 630 based on the fuel inventory data 646 within the past threshold period 644, similar to that described above. The remote controller 180 may determine the calculated amount of fuel 650 based on the fuel interaction data 648 within the past threshold period 644, similar to that described above. The remote controller 180 may compare the actual amount of fuel 642 that left the fuel tank 630 with the calculated amount of fuel 650. In certain embodiments, if the remote controller 180 determines that the actual amount of fuel 642 that left the tank 630 is more than the calculated amount of dispensed fuel 650, the local controller 140 may confirm that the fuel dispensing operation 160 is anomalous. In certain embodiments, if the remote controller 180 determines that the actual amount of fuel 642 that left the tank 630 is more than the calculated amount of dispensed fuel 650 and that the gap between the actual amount of fuel 642 and the calculated amount of dispensed fuel 650 is more than a predetermined fuel volume 656, the remote controller 180 may confirm that the fuel dispensing operation 160 is anomalous.

In response to confirming that the fuel dispensing operation 160 is anomalous, the remote controller 180 may perform one or more counter-measure actions, similar to that described above with respect to the counter-measure operations performed by the local controller 140. For example, the remote controller 180 may communicate the electronic signal 158 to the fuel dispensing terminal 102, where the electronic signal 158 causes the fuel dispensing terminal 102 to stop dispensing fuel; communicate the service message 652; communicate the alert message 654; or wait for a period of time so the bad actor is not alerted until authorities arrive at the fuel dispensing terminal 102. In certain embodiments, the fuel grade associated with the suspected fuel dispensing operation 160 may be used by the remote controller 180 to narrow down the fuel data to be processed to the fuel inventory data 646 and fuel interaction data 648 associated with the fuel grade in question, similar to that described above.

In certain embodiments, using the fuel levels at the fuel tank 630 (operational flow of FIG. 6) may be used as a trigger to initiate the operational flow(s) 200 and/or 300 to determine which particular fuel dispensing operation 160 is anomalous. In other words, using the fuel levels at the fuel tank 630 (operational flow of FIG. 6) may be used to as a trigger to initiate detecting fuel theft (due to manipulated slow flow rate).

For example, fuel inventory data 646 and fuel interaction data 648 may be compared with each other periodically (e.g., every hour, every two hours, five hours, etc.) and it may be determined that the actual amount of fuel 642 that has left the fuel tank 630 (during that period) is greater than the calculated amount of fuel 650 (during that period). In response to determining that the actual amount of fuel 642 that has left the fuel tank 630 (during that period) is greater than the calculated amount of fuel 650 (during that period), the following operations may be performed for each fuel dispensing operation 160 that is not complete yet and each fuel dispensing operations 160 that has been completed during that period.

For example, for a given fuel dispensing operation 160, the actual volume per unit time parameter 150 may be determined and compared with a threshold volume per unit time parameter 152 periodically (e.g., every time interval 196), similar to that described above and in FIGS. 2 and 3. If it is determined that the actual volume per unit time parameter 150 is more than the threshold volume per unit time parameter 152, it may be determined that the fuel dispensing operation 160 is anomalous. In response, the electronic signal 158 may be sent to the fuel dispensing terminal 102 so fuel dispensing operation 160 may be stopped if the fuel dispensing operation 160 is not complete yet, similar to that described in FIG. 2. If the fuel dispensing operation 160 is complete, a file may be generated, video feed, user information, vehicle information, and dispensed fuel amount associated with the fuel dispensing operation 160 may be fetched and stored in the file, and the file may be sent to third parties, similar to that described in FIG. 3. In this manner, the search for detecting the anomalous fuel dispensing operation 160 may be narrowed down to the actual anomalous fuel dispensing operation 160.

Example Method for Anomaly Detection During a Fuel Dispensing Operation Based on Fuel Level Determination FIG. 7 illustrates an example flowchart of a method 700 for anomaly detection during a fuel dispensing operation 160 based on fuel level determination. Modifications, additions, or omissions may be made to method 700. Method 700 may include more, fewer, or other operations. For example, operations may be performed in parallel or in any suitable order. While at times discussed as the system 600, local controller 140, remote controller 180, fuel dispensing terminal 102, or components of any of thereof performing operations, any suitable system or components of the system may perform one or more operations of the method 700. For example, one or more operations of method 700 may be implemented, at least in part, in the form of software instructions 118, 148, and 188 of FIG. 1A, stored on non-transitory, tangible, machine-readable media (e.g., memories 116, 146, and 186 of FIG. 6) that when run by one or more processors (e.g., processors 112, 142, and 182 of FIG. 6) may cause the one or more processors to perform operations 702-718. In certain embodiments, the operation 702 may be optional. In certain embodiments, the method 700 may start with the operation 702 but operation 702 is not be required prior to performing the remainder of the operations of the method 700. For example, in certain embodiments, the method 700 may start from operation 704.

At operation 702, in one embodiment, the local controller 140 determines that a fuel dispensing operation 160 at a fuel dispensing terminal 102 may be anomalous. For example, the local controller 140 may perform the operation described in the discussion of FIG. 2 to determine that the fuel dispensing operation 160 may be anomalous or any other methods detecting possible fuel theft at the fuel dispensing terminal 102. In this embodiment, this operation 702 serves as a trigger for the remainder of the method 700. In other embodiments, however, operation may begin at 704 without the need for any trigger, such as operation 702.

At operation 704, the local controller 140 accesses the fuel inventory data 646. For example, the local controller 140 may query to receive the fuel inventory data 646 from the ATG component 620, the memory 146, and/or any memory storage where the fuel inventory data 646 is stored.

At operation 706, the local controller 140 determines an actual amount of fuel 642 that left the fuel tank 630 based at least on the fuel inventory data 646, similar to that described in FIG. 6. At operation 708, the local controller 140 determines a calculated amount of dispensed fuel 650 associated with one or more fuel dispensing operations within a threshold period 644. For example, the local controller 140 may query for the fuel interaction data 648 for the past threshold period 644, receive the fuel interaction data 648, and determine the calculated amount of fuel 650 using the fuel interaction data 648, similar to that described in FIG. 6. At operation 710, the local controller 140 compares the actual amount of fuel 642 that left the fuel tank 630 with the calculated amount of fuel 650. At operation 712, the local controller 140 determines whether the actual amount of fuel 642 that left the fuel tank 630 is more than the calculated amount of fuel 650. If it is determined that the actual amount of fuel 642 is more than the calculated amount of fuel 650, method 700 proceeds to operation 714. Otherwise, method 700 may proceed to operation 718.

At operation 714, the local controller 140 confirms that the fuel dispensing operation 160 is anomalous. At operation 716, the local controller 140 communicates an electronic signal 158 to the fuel dispensing terminal 102 that causes the fuel dispensing terminal 102 to stop dispensing fuel. At operation 718, the local controller 140 continues monitoring the fuel dispensing operation 160.

Although method 700 is described to be performed by the local controller 140, one of ordinary skill in the art would appreciate other embodiments in light of the present disclosure. For example, one or more operations of method 700 may be performed by the remote controller 180. In the same or another example, one or more operations of method 700 may be performed by the fuel dispensing terminal 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory configured to store fuel inventory data that indicates levels of fuel in a fuel tank during a time period;

a processor, operably coupled to the memory, and configured to:

determine an actual amount of fuel that left the fuel tank based at least in part upon the fuel inventory data;

determine a calculated amount of dispensed fuel associated with one or more fuel dispensing operations during the time period;

compare the actual amount of fuel that left the fuel tank with the calculated amount of dispensed fuel;

determine that the actual amount of fuel that left the fuel tank is more than the calculated amount of dispensed fuel; and in response to determining that the actual amount of fuel that left the fuel tank is more than the calculated amount of dispensed fuel:

conclude that at least one fuel dispensing operation from among the one or more fuel dispensing operations is anomalous; and cause the fuel dispensing terminal to stop dispensing fuel, wherein the fuel dispensing terminal is associated with the at least one fuel dispensing operation.

2. The system of claim 1, wherein the processor is further configured to communicate a service message that indicates the at least one fuel dispensing operation at the fuel dispensing terminal needs attention.

3. The system of claim 1, wherein:

the processor is further configured to determine that the at least one fuel dispensing operation at the fuel dispensing terminal is potentially anomalous;

accessing the fuel inventory data is in response to determining that the at least one fuel dispensing operation at the fuel dispensing terminal is potentially anomalous; and determining that the at least one fuel dispensing operation at the fuel dispensing terminal is potentially anomalous comprises:

perform the following operations at at least one predetermined time interval from among a plurality of predetermined time intervals within a threshold wait period, wherein the threshold wait period is associated with a unit time parameter:

determine an identifier value associated with a volume of fuel dispensed from the fuel dispensing terminal;

determine a measured fuel volume per unit time parameter associated with fuel dispensed from the fuel dispensing terminal based at least in part upon the determined identifier value, a unit parameter, and the unit time parameter;

compare the measured fuel volume per unit time parameter with a threshold fuel volume per unit time parameter; and determine that the measured fuel volume per unit time parameter is less than the threshold fuel volume per unit time parameter.

4. The system of claim 1, wherein:

determining the calculated amount of dispensed fuel associated with the one or more fuel dispensing operations during the time period is in response to accessing fuel interaction data that indicates an identifier value associated with aggregated fuel requests made within the time period by one or more users during one or more fuel dispensing operations; and determining the calculated amount of dispensed fuel is based at least in part upon the fuel interaction data.

5. The system of claim 1, wherein the processor is further configured to:

before concluding that the fuel dispensing operation at the fuel dispensing terminal is anomalous, determine that the fuel dispensing operation is associated with a particular fuel grade; and wherein determining the calculated amount of dispensed fuel associated with the one or more fuel dispensing operations during the time period is in response to accessing fuel interaction data associated with the particular fuel grade, wherein the fuel interaction data indicates an amount charged for the calculated amount of dispensed fuel with respect to the particular fuel grade.

6. The system of claim 1, wherein:

the processor is further configured to determine that the at least one fuel dispensing operation at the fuel dispensing terminal is potentially anomalous;

accessing the fuel inventory data is in response to determining that the at least one fuel dispensing operation at the fuel dispensing terminal is potentially anomalous;

determining that the at least one fuel dispensing operation at the fuel dispensing terminal is potentially anomalous comprises:

perform the following operations at at least one predetermined time interval from among a plurality of predetermined time intervals within a threshold wait period, wherein the threshold wait period is associated with a unit time parameter:

determine an identifier value associated with a volume of fuel dispensed from the fuel dispensing terminal;

determine a measured aggregate fuel volume associated with the fuel dispensed from the fuel dispensing terminal based at least in part upon the determined identifier value and a unit parameter;

determine a measured fuel volume per unit time parameter associated with the fuel dispensed from the fuel dispensing terminal by dividing the measured aggregate fuel volume by the unit time parameter;

compare the measured fuel volume per unit time parameter with a threshold fuel volume per unit time parameter; and determine that the measured fuel volume per unit time parameter is less than the threshold fuel volume per unit time parameter.

7. The system of claim 1, wherein determining that the actual amount of fuel that left the fuel tank is more than the calculated amount of dispensed fuel comprises determining that a discrepancy between the actual amount of fuel that left the fuel tank and the calculated amount of dispensed fuel is more than a predetermined fuel volume.

8. A system comprising:

a memory configured to store fuel inventory data that indicates levels of fuel in a fuel tank during a time period;

a processor, operably coupled to the memory, and configured to:

determine an actual amount of fuel that left the fuel tank based at least in part upon the fuel inventory data;

determine a calculated amount of dispensed fuel associated with one or more fuel dispensing operations during the time period;

compare the actual amount of fuel that left the fuel tank with the calculated amount of dispensed fuel;

determine that the actual amount of fuel that left the fuel tank is more than the calculated amount of dispensed fuel; and in response to determining that the actual amount of fuel that left the fuel tank is more than the calculated amount of dispensed fuel:

conclude that at least one fuel dispensing operation from among the one or more fuel dispensing operations is anomalous; and communicate a service message that indicates the fuel dispensing operation at a fuel dispensing terminal needs attention, wherein the fuel dispensing terminal is associated with the at least one fuel dispensing operation.

9. The system of claim 8, wherein the processor is further configured to:

in response to determining that the actual amount of fuel that left the fuel tank is more than the calculated amount of dispensed fuel:

communicate an alert message that indicates a discrepancy between the actual amount of fuel that left the fuel tank and the calculated amount of dispensed fuel; and allow for the fuel dispensing operation to continue for a second threshold period.

10. The system of claim 9, wherein the alert message is sent to law enforcement officer.

11. The system of claim 8, wherein the processor is further configured to cause the fuel dispensing terminal to stop dispensing fuel.

12. The system of claim 8, wherein determining that the actual amount of fuel that left the fuel tank is more than the calculated amount of dispensed fuel comprises determining that a discrepancy between the actual amount of fuel that left the fuel tank and the calculated amount of dispensed fuel is more than a predetermined fuel volume.

13. The system of claim 8, wherein:

the processor is further configured to determine that the at least one fuel dispensing operation at the fuel dispensing terminal is potentially anomalous;

accessing the fuel inventory data is in response to determining that the at least one fuel dispensing operation at the fuel dispensing terminal is potentially anomalous;

determining that the at least one fuel dispensing operation at the fuel dispensing terminal is potentially anomalous comprises:

perform the following operations at at least one predetermined time interval from among a plurality of predetermined time intervals within a threshold wait period, wherein the threshold wait period is associated with a unit time parameter:

determine an identifier value associated with a volume of fuel dispensed from the fuel dispensing terminal;

determine a measured aggregate fuel volume associated with the fuel dispensed from the fuel dispensing terminal based at least in part upon the determined identifier value and a unit parameter;

determine a measured fuel volume per unit time parameter associated with the fuel dispensed from the fuel dispensing terminal by dividing the measured aggregate fuel volume by the unit time parameter;

compare the measured fuel volume per unit time parameter with a threshold fuel volume per unit time parameter; and determine that the measured fuel volume per unit time parameter is less than the threshold fuel volume per unit time parameter.

14. The system of claim 8, wherein:

the processor is further configured to determine that the at least one fuel dispensing operation at the fuel dispensing terminal is potentially anomalous;

accessing the fuel inventory data is in response to determining that the at least one fuel dispensing operation at the fuel dispensing terminal is potentially anomalous; and determining that the at least one fuel dispensing operation at the fuel dispensing terminal is potentially anomalous comprises:

perform the following operations at at least one predetermined time interval from among a plurality of predetermined time intervals within a threshold wait period, wherein the threshold wait period is associated with a unit time parameter:

determine an identifier value associated with a volume of fuel dispensed from the fuel dispensing terminal;

determine a measured fuel volume per unit time parameter associated with fuel dispensed from the fuel dispensing terminal based at least in part upon the determined identifier value, a unit parameter, and the unit time parameter;

compare the measured fuel volume per unit time parameter with a threshold fuel volume per unit time parameter; and determine that the measured fuel volume per unit time parameter is less than the threshold fuel volume per unit time parameter.

15. A method comprising:

accessing fuel inventory data that indicates levels of fuel in a fuel tank during a time period;

determining an actual amount of fuel that left the fuel tank based at least in part upon the fuel inventory data;

determining a calculated amount of dispensed fuel associated with one or more fuel dispensing operations during the time period;

comparing the actual amount of fuel that left the fuel tank with the calculated amount of dispensed fuel;

determining that the actual amount of fuel that left the fuel tank is more than the calculated amount of dispensed fuel; and in response to determining that the actual amount of fuel that left the fuel tank is more than the calculated amount of dispensed fuel:

concluding that at least one fuel dispensing operation from among the one or more fuel dispensing operations is anomalous; and causing the fuel dispensing terminal to stop dispensing fuel, wherein the fuel dispensing terminal is associated with the at least one fuel dispensing operation.

16. The method of claim 15, further comprising communicating a service message that indicates the at least one fuel dispensing operation at the fuel dispensing terminal needs attention.

17. The method of claim 15, wherein:

the method further comprises determining that the at least one fuel dispensing operation at the fuel dispensing terminal is potentially anomalous;

accessing the fuel inventory data is in response to determining that the at least one fuel dispensing operation at the fuel dispensing terminal is potentially anomalous; and determining that the at least one fuel dispensing operation at the fuel dispensing terminal is potentially anomalous comprises:

performing the following operations at at least one predetermined time interval from among a plurality of predetermined time intervals within a threshold wait period, wherein the threshold wait period is associated with a unit time parameter:

determining an identifier value associated with a volume of fuel dispensed from the fuel dispensing terminal;

determining a measured fuel volume per unit time parameter associated with fuel dispensed from the fuel dispensing terminal based at least in part upon the determined identifier value, a unit parameter, and the unit time parameter;

comparing the measured fuel volume per unit time parameter with a threshold fuel volume per unit time parameter; and determining that the measured fuel volume per unit time parameter is less than the threshold fuel volume per unit time parameter.

18. The method of claim 15, wherein:

determining the calculated amount of dispensed fuel associated with the one or more fuel dispensing operations during the time period is in response to accessing fuel interaction data that indicates an identifier value associated with aggregated fuel requests made within the time period by one or more users during one or more fuel dispensing operations; and determining the calculated amount of dispensed fuel is based at least in part upon the fuel interaction data.

19. The method of claim 15, further comprising:

before concluding that the fuel dispensing operation at the fuel dispensing terminal is anomalous, determining that the fuel dispensing operation is associated with a particular fuel grade; and wherein determining the calculated amount of dispensed fuel associated with the one or more fuel dispensing operations during the time period is in response to accessing fuel interaction data associated with the particular fuel grade, wherein the fuel interaction data indicates an amount charged for the calculated amount of dispensed fuel with respect to the particular fuel grade.

20. The method of claim 15, wherein:

the method further comprises determining that the at least one fuel dispensing operation at the fuel dispensing terminal is potentially anomalous;

accessing the fuel inventory data is in response to determining that the at least one fuel dispensing operation at the fuel dispensing terminal is potentially anomalous;

determining that the at least one fuel dispensing operation at the fuel dispensing terminal is potentially anomalous comprises:

performing the following operations at at least one predetermined time interval from among a plurality of predetermined time intervals within a threshold wait period, wherein the threshold wait period is associated with a unit time parameter:

determining an identifier value associated with a volume of fuel dispensed from the fuel dispensing terminal;

determining a measured aggregate fuel volume associated with the fuel dispensed from the fuel dispensing terminal based at least in part upon the determined identifier value and a unit parameter;

determining a measured fuel volume per unit time parameter associated with the fuel dispensed from the fuel dispensing terminal by dividing the measured aggregate fuel volume by the unit time parameter;

comparing the measured fuel volume per unit time parameter with a threshold fuel volume per unit time parameter; and determining that the measured fuel volume per unit time parameter is less than the threshold fuel volume per unit time parameter.

* * * * *